(12) United States Patent
Golub et al.

(10) Patent No.: US 12,190,235 B2
(45) Date of Patent: Jan. 7, 2025

(54) SYSTEM FOR TRAINING AN ARTIFICIAL NEURAL NETWORK

(71) Applicant: Microsoft Technology Licensing, LLC, Redmond, WA (US)

(72) Inventors: Maximilian Golub, Seattle, WA (US); Ritchie Zhao, Bellevue, WA (US); Eric Chung, Woodinville, WA (US); Douglas Burger, Bellevue, WA (US); Bita Darvish Rouhani, Bellevue, WA (US); Ge Yang, Bellevue, WA (US); Nicolo Fusi, Watertown, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1016 days.

(21) Appl. No.: 17/163,299

(22) Filed: Jan. 29, 2021

(65) Prior Publication Data
US 2022/0245444 A1 Aug. 4, 2022

(51) Int. Cl.
*G06N 3/08* (2023.01)
*G06F 17/18* (2006.01)

(52) U.S. Cl.
CPC ............... *G06N 3/08* (2013.01); *G06F 17/18* (2013.01)

(58) Field of Classification Search
CPC .................................. G06N 3/08; G06F 17/18
See application file for complete search history.

(56) References Cited

U.S. PATENT DOCUMENTS

| | | | | |
|---|---|---|---|---|
| 11,822,544 | B1* | 11/2023 | Carvalho | G06N 20/00 |
| 2019/0221202 | A1* | 7/2019 | Li | G06F 17/16 |
| 2020/0026992 | A1* | 1/2020 | Zhang | G06N 3/084 |
| 2020/0210840 | A1 | 7/2020 | Darvish Rouhani et al. | |
| 2020/0264876 | A1* | 8/2020 | Lo | G06N 3/084 |
| 2020/0274549 | A1* | 8/2020 | Sung | G06N 5/04 |
| 2021/0201201 | A1* | 7/2021 | Xia | G06F 11/302 |
| 2021/0397648 | A1* | 12/2021 | Zornes | G06N 20/00 |
| 2022/0142713 | A1* | 5/2022 | Oren | A61B 5/6858 |
| 2022/0245444 | A1* | 8/2022 | Golub | G06F 17/18 |

(Continued)

OTHER PUBLICATIONS

Sam McCandlish et al., "An Empirical Model of Large-Batch Training", OpenAI Dota Team, Dec. 14, 2018, 35 pages.

(Continued)

*Primary Examiner* — David E Choi
(74) *Attorney, Agent, or Firm* — Holzer Patel Drennan

(57) ABSTRACT

Embodiments of the present disclosure include a system for optimizing an artificial neural network by configuring a model, based on a plurality of training parameters, to execute a training process, monitoring a plurality of statistics produced upon execution of the training process, and adjusting one or more of the training parameters, based on one or more of the statistics, to maintain at least one of the statistics within a predetermined range. In some embodiments, artificial intelligence (AI) processors may execute a training process on a model, the training process having an associated set of training parameters. Execution of the training process may produce a plurality of statistics. Control processor(s) coupled to the AI processor(s) may receive the statistics, and in accordance therewith, adjust one or more of the training parameters to maintain at least one of the statistics within a predetermined range during execution of the training process.

20 Claims, 21 Drawing Sheets

(56) References Cited

U.S. PATENT DOCUMENTS

| | | | | |
|---|---|---|---|---|
| 2022/0405641 | A1* | 12/2022 | Zhang | G06N 20/00 |
| 2023/0142401 | A1* | 5/2023 | Brook | G06N 3/08 |
| | | | | 706/12 |
| 2023/0145544 | A1* | 5/2023 | Sternby | G06N 3/08 |
| | | | | 713/176 |
| 2023/0403675 | A1* | 12/2023 | Li | H04W 64/003 |

OTHER PUBLICATIONS

Huang, et al., "Adaptive Precision Training for Resource Constrained Devices", In Repository of arXiv:2012.12775v1, Dec. 23, 2020, 6 Pages.

Apshyna, Viktoriia, "Sparse Artificial Neural Networks: Adaptive Performance-based Connectivity Inspired by Human-Brain Processes", In Proceedings of 32th Twente Student Conference on IT, Jan. 31, 2020, 7 Pages.

Mai, et al., "KungFu: Making Training in Distributed Machine Learning Adaptive", In Proceedings of the 14th USENIX Symposium on Operating Systems Design and Implementation, Nov. 4, 2020, pp. 937-954.

"International Search Report & Written Opinion issued in PCT Application No. PCT/US22/011204", Mailed Date: May 2, 2022, 14 Pages.

* cited by examiner

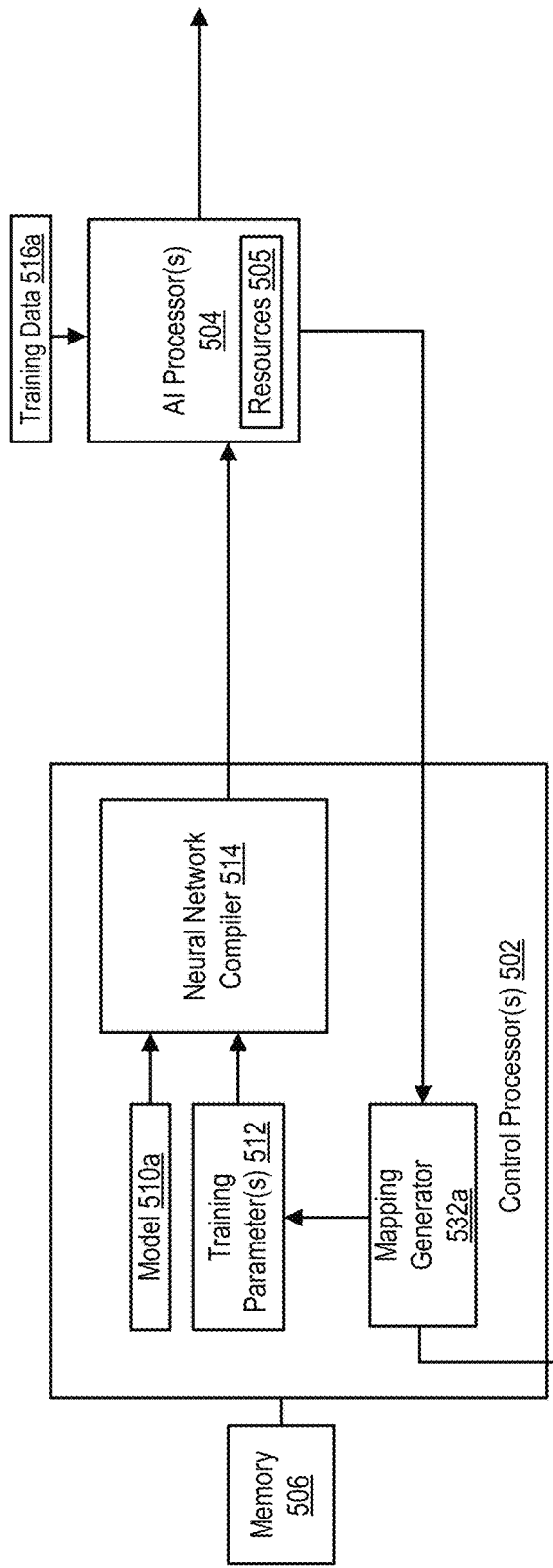
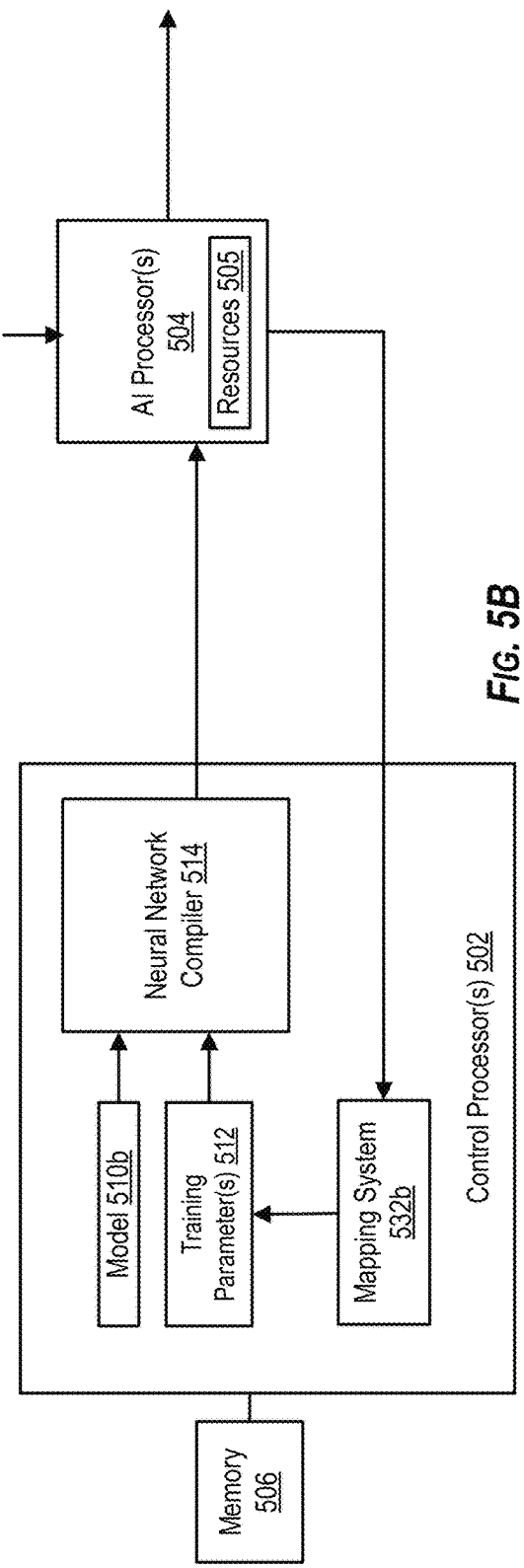
FIG. 5A
FIG. 5B

SYSTEM FOR TRAINING AN ARTIFICIAL NEURAL NETWORK

BACKGROUND

The present disclosure relates to a computing system. More particularly, the present disclosure relates to techniques for training an artificial neural network.

Artificial intelligence (AI) systems have allowed major advances in a variety of fields such as natural language processing and computer vision. AI systems typically include an AI model (e.g., a neural network model) comprised of multiple layers. Each layer typically includes nodes (aka, neurons) that are connected to nodes in other layers. Connections between nodes are associated with trainable weights for increasing or decreasing strengths of the connections. In operation, a data set is applied to an input layer of the model and outputs are generated at an output layer. The outputs may correspond to classification, recognition, or prediction of a particular feature of the input data set. To train the neural network, the outputs are compared against known outputs for the input data set and an error is backpropagated through the model and parameters of the model are adjusted.

One problem with neural network models is that larger models typically require greater computational resources and/or time to process. This is due largely to the number of parameters associated with such models which require calculation.

BRIEF DESCRIPTION OF THE DRAWINGS

Various embodiments of the present disclosure are illustrated by way of example and not limitation in the figures of the accompanying drawings.

FIG. 5A illustrates a system which generates mappings by training a smaller network according to an embodiment.

FIG. 5B illustrates a system which loads mappings for training a larger network according to an embodiment.

DETAILED DESCRIPTION

Figure 1:
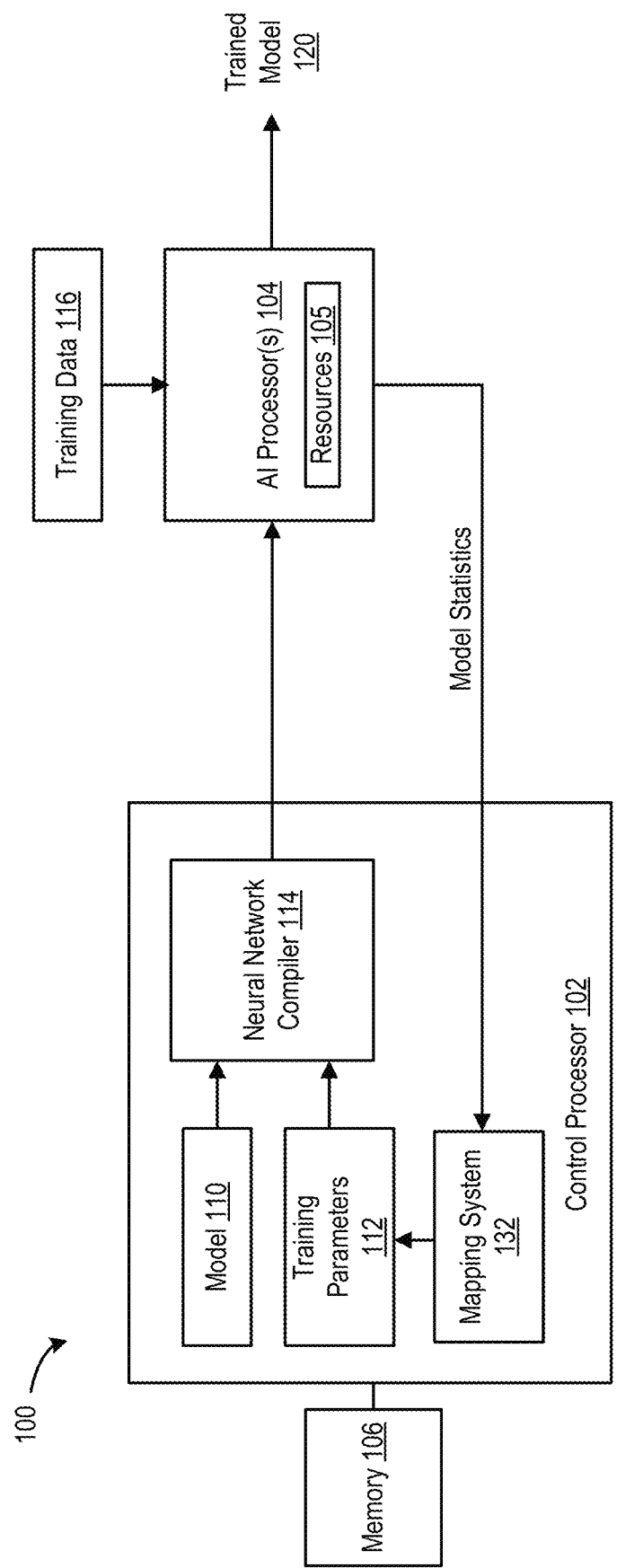
FIG. 1 illustrates a system for training an artificial neural network according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

For deep learning, artificial intelligence (AI) models (e.g., neural network models) typically increase in the accuracy of their predictions with increase in size (e.g., the number of layers, nodes, connections, and/or the like). This is often measured during training as a desirable decrease in validation loss (e.g., more accurate in predictions).

However, increases in model size typically require increases in computational resources and/or time to process the model. This is due to the growing number of parameters associated with increases in model size which, in turn, require further calculation.

For example, for each node of a neural network (NN) model, a forward pass calculation represented by $y=f(x_0w_0+x_1w_1+\ldots+x_nw_n)$ may be executed, where y represents an output value of the node, x represents input values from connected nodes 0 to n, and w represents trainable weights (e.g., parameters) associated with connections from nodes. During training, outputs of the model (e.g., at the last layer) may be compared against known outputs for an input data set. Then, a similar backward pass calculation (e.g., backpropagation) may be executed to determine gradients and weight updates. For example, in a process known as stochastic gradient descent (SGD), backpropagation may be done multiple times (e.g., iteratively) for subsets of the training data set. Calculations in the forward and backward passes are typically performed by matrix multiplication (aka, Mat-Mul) operations executed numerous times for each layer of a model. As a result, the number of calculations required for training a model may grow quickly with increases in model size.

One technique to reduce computational resources and/or time to process a model is to reduce the precision (aka, bit-width) of calculations associated with the model. For example, computational resources and/or time to process a model requiring calculations at a higher precision, such as IEEE 754 single-precision 32-bit floating-point format (aka, FP32), may be reduced when compared to computational resources and/or time to process a model with calculations at a lower precision, such as 8-bit integer (aka, INT8).

However, when precision is reduced below a certain threshold, models often fail to improve in the accuracy of their predictions. Moreover, models sometimes worsen in the accuracy of their predictions with continued training (e.g., divergence).

Features and advantages of the present disclosure include improving training of neural network models by automatically adjusting one or more training parameters associated with the model, based on one or more statistics associated with the model, to maintain particular statistics within a predetermined range. In some embodiments, adjusting training parameters based on statistics associated with model may be referred to as "introspective" training. Techniques disclosed herein may support improved training performance that scale with model size with reduced scaling of compute resources, for example. Accordingly, some embodiments of the present disclosure provide an auto-scaling introspective form of training for neural network models. Advantageously, this may allow lower validation losses (e.g., improved accuracy in predictions) toward convergence while providing a reduction of computational resources and/or time to process (e.g., reduction of compute cycles) for very large models. Certain embodiments described below may further include automated techniques for tuning parameters (e.g., based on statistics).

FIG. 1 illustrates a system 100 for optimizing an artificial neural network according to an embodiment. In this example, one or more control processor(s) 102 may be in communication with one or more AI processor(s) 104. Control processor(s) 102 may include traditional CPUs, FPGAs, systems on a chip (SoC), application specific integrated circuits (ASICs), or embedded ARM controllers, for example, or other processors that can execute software and communicate with AI processor(s) 104 based on instructions in the software. AI processor(s) 104 may include graphics processors (GPUs), AI accelerators, or other digital processors optimized for AI operations (e.g., matrix multiplications versus Von Neuman Architecture processors such as the x86 processor). Example AI processor(s) may include GPUs (e.g., NVidia Volta® with 800 cores and 64 MultiAccumulators) or a Tensor Processor Unit (TPU) (e.g., 4 cores with 16 k operations in parallel), for example.

In this example, a control processor 102 may be coupled to memory 106 (e.g., non-transitory computer readable storage medium) having stored thereon program code executable by control processor 102. Control processor 102 receive (e.g., load) a neural network model 110 (hereinafter, "model") and a plurality of training parameters 112 for configuring the model 110. Model 110 may comprise, for example, a graph defining multiple layers of a neural network with nodes in the layers connected to nodes in other layers and with connections between nodes being associated with trainable weights, for example. Training parameters 112 (aka, tuning parameters or model parameters) may comprise one or more values which may be adjusted to affect configuration and/or execution of model 110. Training parameters that may be used in various embodiments include model size, batch size, learning rate, precision (e.g., number of bits in a binary representation of data values), and sparsity (e.g., number of zeros in the data values), normalization (e.g., weight decay or L2 normalization), entropy, and/or training steps, for example, as well as other parameters that may be characterized and adjusted as would be apparent to those skilled in the art in light of the present disclosure. In some embodiments, training parameters may include one or more hyperparameters (e.g., parameters used to control learning of the neural network) as known to those skilled in the art.

Control processor 102 may also execute a neural network compiler 114. The neural network compiler 114 may comprise a program that, when executed, may receive model 110 and training parameters 112 and configure resources 105 on one or more AI processors to implement and execute model 110 in hardware. For example, neural network compiler 114 may receive model 110 and configure model 110, based on training parameter(s) 112, to execute a training process executed on AI processor(s) 104. The neural network compiler 114 may configure to AI processor(s) 104 to implement calculations of input activations, weights, backpropagation and the like to perform the training process. AI processor(s) 104, in turn, may use resources 105, as determined by the neural network compiler 114, to receive and process training data 116 with model 110 (e.g., the training process). For example, resources 105 may include registers, multipliers, adders, buffers, and other digital blocks used to perform operations to implement model 110. Thus, AI processor(s) 104 may perform numerous matrix multiplication calculations in a forward pass, compare outputs against known outputs for subsets of training data 116, and perform further matrix multiplication calculations in a backward pass to determine gradients or weight updates, for example. This process may continue through multiple iterations as the training data is processed. In some embodiments, AI processor(s) 104 may determine the weight updates according to a backpropagation algorithm, such as stochastic gradient descent (SGD), Adaptive Moment Estimation (ADAM), and/or the like, which may be configured by the neural network compiler 114, for example.

During execution of model 110, AI processor(s) 104 may generate, at each iteration, a plurality of values for activations, weights, gradients, and weight updates, for example, at each layer of the model. Features and advantages of the present disclosure include monitoring the statistics of such values at certain locations within the neural network and adjusting the training parameters 112 (e.g., on a layer-by-layer basis) based on such statistics to improve training.

Monitored statistics may include, for example, one or more of: measures of backpropagation gradients, gradient noise, node activations, weights, weight updates, and/or the like, as described in more detail below. Measures of statistics may include mean measurements, standard deviation measurements, percentage of zero values measurements, and/or the like, for example.

In some embodiments, control processor 102 may execute a mapping system 132. The mapping system 132, for example, may process the statistic(s) to automatically adjust one or more training parameters 112 associated with portions of the model so that one or more statistic(s) may be maintained within predetermined range(s) (e.g., at particular locations within the model).

The adjusted training parameter 112 may be provided to the neural network compiler 114 for updating the implementation of model 110 on AI processor(s) 104 for subsequent execution by the AI processor(s). This process may repeat in iterations for subsets of training data 116 until model 110 converges through a predetermined number of training steps. Ultimately, a trained model 120 may be produced for deployment in the given application, for example. Advantageously, by adjusting training parameters 112 so that statistics are maintained within predetermined range(s), the resulting trained models may be optimized to improve the accuracy of their predictions with a decrease of computational resources and/or time to process (e.g., reduction of compute cycles), for example.

In some embodiments, different training parameters may be used for different batches of training data used to train the same model. This may be referred to as a hybrid mode. For example, different precisions may be used at different portions of the model being trained for different batches running on different processors (or processor groups working on the same training batch). Hybrid mode may be an extension of having the ability to distribute training over multiple different training nodes, with each node running at its own precision, for example. For instance, when precision is reduced, gradient noise may increased, which can lead to training divergence and less than optimum performance. In some embodiments, adding a few high precision guide nodes to a distributed training run is an effective way to lower the overall gradient noise and improve the loss of the model. In a data parallel setting, this can be seen as sampling 1 to M out of N total batches in higher precision, where N<<M, for example.

As indicated above, in some embodiments, the model 110 may be partitioned to execute on multiple AI processors 104. For example, a first portion of the model 110 may be executed on a first AI processor and a second portion of the model 110 may be executed on a second AI processor. In this example, measures of the plurality of values may be received from the multiple AI processors for analysis by one or more control processor(s) 102. In various embodiments, this may allow an efficient distribution of the training process for faster deployment while optimizing the model 110. In various embodiments, the statistics based on the values may be generated by the AI processor(s) or by the control processor(s), for example.

Figure 2:
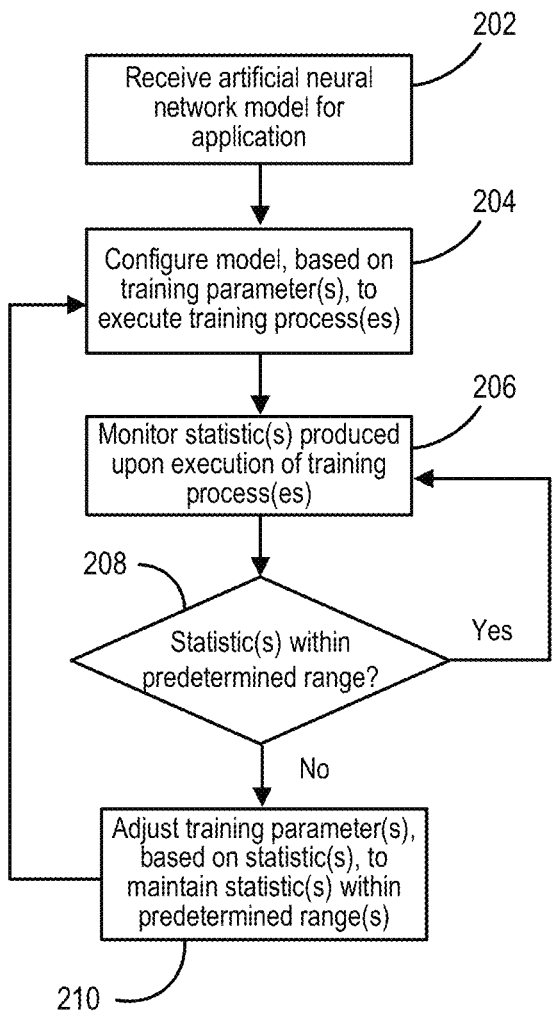
FIG. 2 illustrates a method of training an artificial neural network according to an embodiment.

FIG. 2 illustrates a method of training an artificial neural network according to an embodiment. In this example, at 202, one or more control processor(s) may receive a neural network model for a given application. The control processor(s) may be like the control processor(s) 102. At 204, control processor(s) may configure the model, based on training parameter(s), to execute training process(es) on one or more AI processor(s). The AI processor(s) may be like the AI processor(s) 104. At 206, control processor(s) may monitor a plurality of statistics produced upon execution of the training process(es) by AI processor(s). At 208, control processor(s) may determine if one or more statistic(s) are within predetermined range(s). If the one or more statistic(s) are within predetermined range(s) (Yes), at 206 control processor(s) may continue monitoring the plurality of statistics, in a loop, until the model converges through a predetermined number of training steps. However, if the one or more statistic(s) are not within predetermined range(s) (No), at 210 control processor(s) may adjust training parameter(s), based on statistic(s), to maintain the one or more statistic(s) within predetermined range(s). Then, returning to 204, control processor(s) may configure the model, based on the adjusted training parameter(s), to execute training process(es) on the AI processor(s).

Figure 3A:
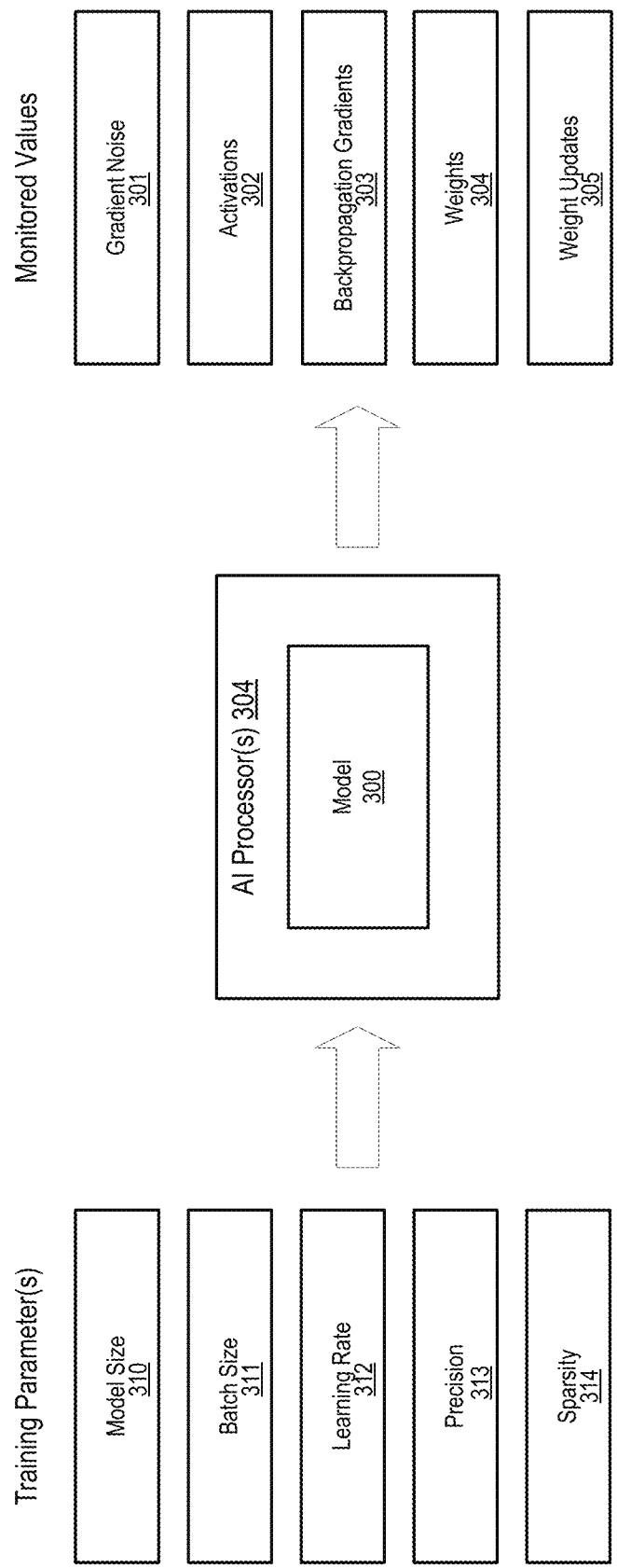
FIG. 3A illustrates training parameters and monitored values in an artificial neural network according to an embodiment.

FIG. 3A illustrates training parameters and monitored values in an artificial neural network according to an embodiment. In this example, a model 300 is loaded onto one or more AI processors 304 for execution of a training process. The AI processors 304 are further configured with the following training parameters: model size 310, batch size 311, learning rates 312, precisions 313, and sparsity(s) 314. As illustrated in more detail below, different configurations of different training parameters can change the behavior of the neural network model during training. For instance, a training process may be configured to execute model 300 having a model size, batch size, learning rates, precisions, and sparsity(s). As illustrated further below, changes in training parameters result in different values occurring throughout the network being trained. Values of gradient noise 301, activations 302, gradients 303, weights 304, and weight updates 305 may be monitored at particular locations in the network and at particular times during the training process and used to modify the training parameters. Features and advantages of the present disclosure may configure certain training parameters (e.g., learning rate, precision, sparsity) at particular locations within the model (e.g., at one or more particular layers) to have particular values that result in improve training performance. Similarly, training parameters may be changed over time to optimize the training process and reduce compute and/or improve accuracy, for example.

Figure 3B:
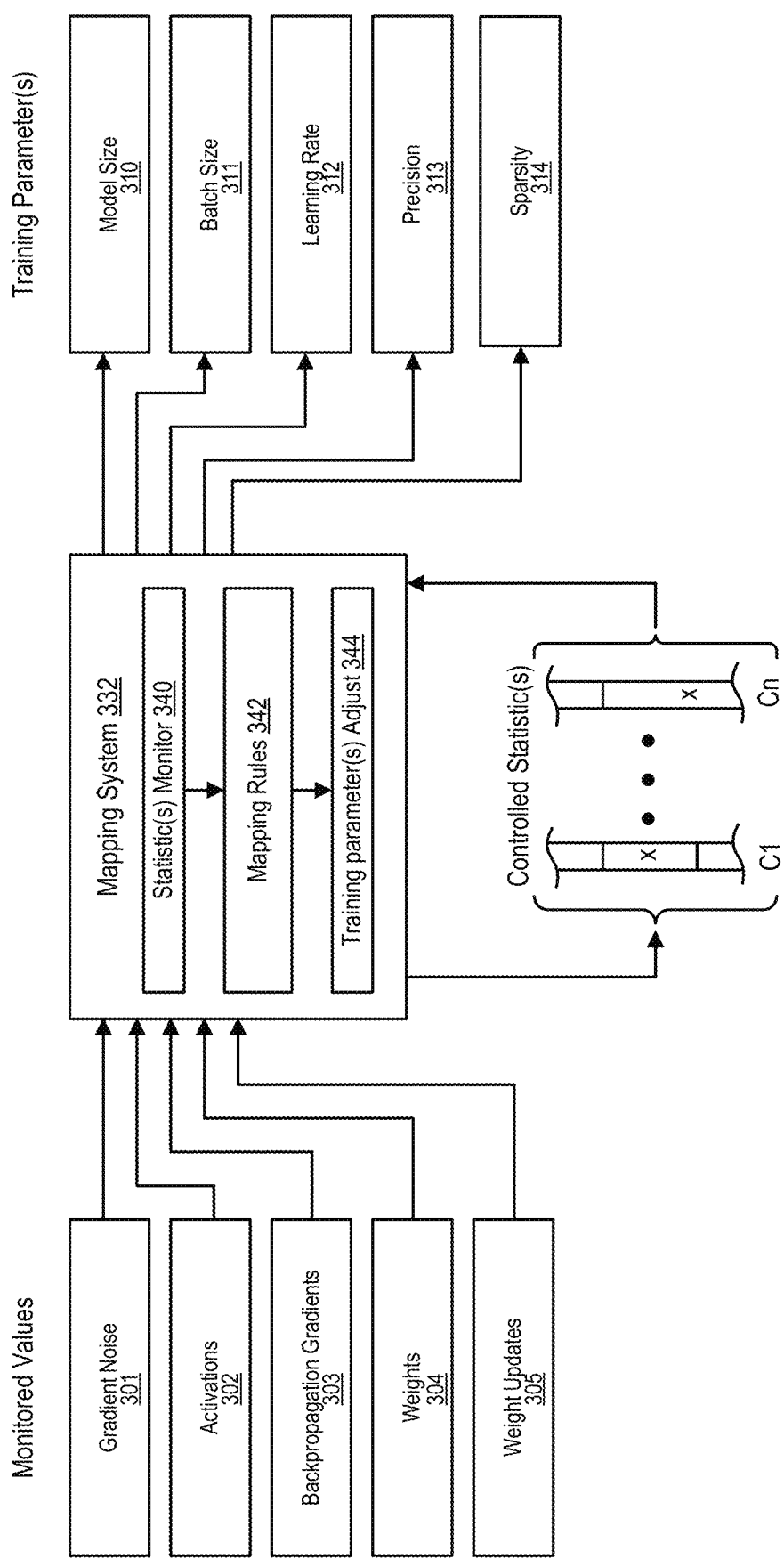
FIG. 3B illustrates a mapping system for training an artificial neural network according to an embodiment.

FIG. 3B illustrates a mapping system for training an artificial neural network according to an embodiment. In this example, a mapping system 332 may comprise a statistic(s) monitor 340, mapping rules 342, and a training parameter(s) adjustment output 344. The mapping system 332 may be one example of the mapping system 132, for example.

In some embodiments, the statistic(s) monitor 340 may receive values associated with a given model executing on one or more AI processors, perform statistic(s) processing (e.g., determining means, standard deviations, or percentages of zeros), and send the statistic(s) to the mapping rules 342. Values generated during model execution may be received from AI processors executing various portions of the model at various times during execution of a training process by AI processor(s). In this example, statistic(s) may include measures of gradient noise 301, activations 302, backpropagation gradients 303, weights 304, and weight updates 305, taken at particular layers in the model being trained, for example. As mentioned above, measures of statistics may include one or more of a mean, a standard deviation, and/or percentage of zero values (or equivalently, non-zero values), for example. Mapping rules 342 specify relations between one or more monitored statistics and one or more training parameters. Mapping rules may be generated by characterizing training of a model using a smaller model size, for example, to establish relationships between statistics and training parameters and define mapping rules to control the training parameters based on the statistics to optimize training, for example. Accordingly, these statistics may be used to adjust model size 310, batch size 311, learning rates 312 (e.g., at particular locations or at particular times), precision 313 (e.g., in particular nodes or layers), and sparsity 314 dynamically, for example, to improve training accuracy and/or increase the computational efficiency of the training process.

Embodiments of the present disclosure may monitor a gradient noise 301 at particular locations in neural network model and adjust training parameters to control the gradient noise within a predetermine range. As known to those skilled in the art, gradient noise refers to noise in the backpropagation gradient. For example, gradient noise may be expressed as the signal-to-noise ratio of the gradient. In some cases, gradient noise may be related to quantization effects (e.g., representation of the gradient by binary values). Accordingly, gradient noise may be a function of a quantization noise to signal ratio (QNSR), where the signal is an ideal gradient value, for example. Improved training may result when a "healthy" amount of gradient noise exists at certain nodes or layers in a network. Accordingly, embodiments of the present disclosure may monitor gradient noise at particular locations in the network and/or times during training and adjust certain training parameters to maintain the gradient noise within a predetermined range.

For example, gradient noise is a function of batch size, where smaller batches result in more gradient noise and larger batch sizes result is less gradient noise (e.g., the batch gradient will be closer to the ideal gradient). As another example, quantization noise (e.g., QNSR) decreases as the precision (e.g., number of bits) increases, and quantization noise increases as the precision decreases. As the Quantization noise increases, the gradient noise is also increased. Accordingly, training parameters impacting gradient noise in the network may be adjusted during training based on monitored gradient noise at particular portions of the model (e.g., nodes or layers) to maintain the gradient noise in such locations and/or times within an optimal range of values, for example.

Similarly, statistics for gradient noise 301, activations 302, gradients 303, weights 304, and weight updates 305 may be mapped, alone or in various combinations, to control model size 310, batch size 311, learning rates 312, precisions 313, or sparsity 314. Advantageously, learning rates 312, precisions 313, and/or sparsity 314 may be targeted to particular portions of the network model so that different portions of a model being trained are configured differently, for example, to optimize training. Accordingly, in some example embodiments, monitored values may be maintained in optimal ranges (e.g., a>x, a<x<b, x<a) to promote efficient training as illustrated by controlled statistics C1 . . . CN.

Figure 4:
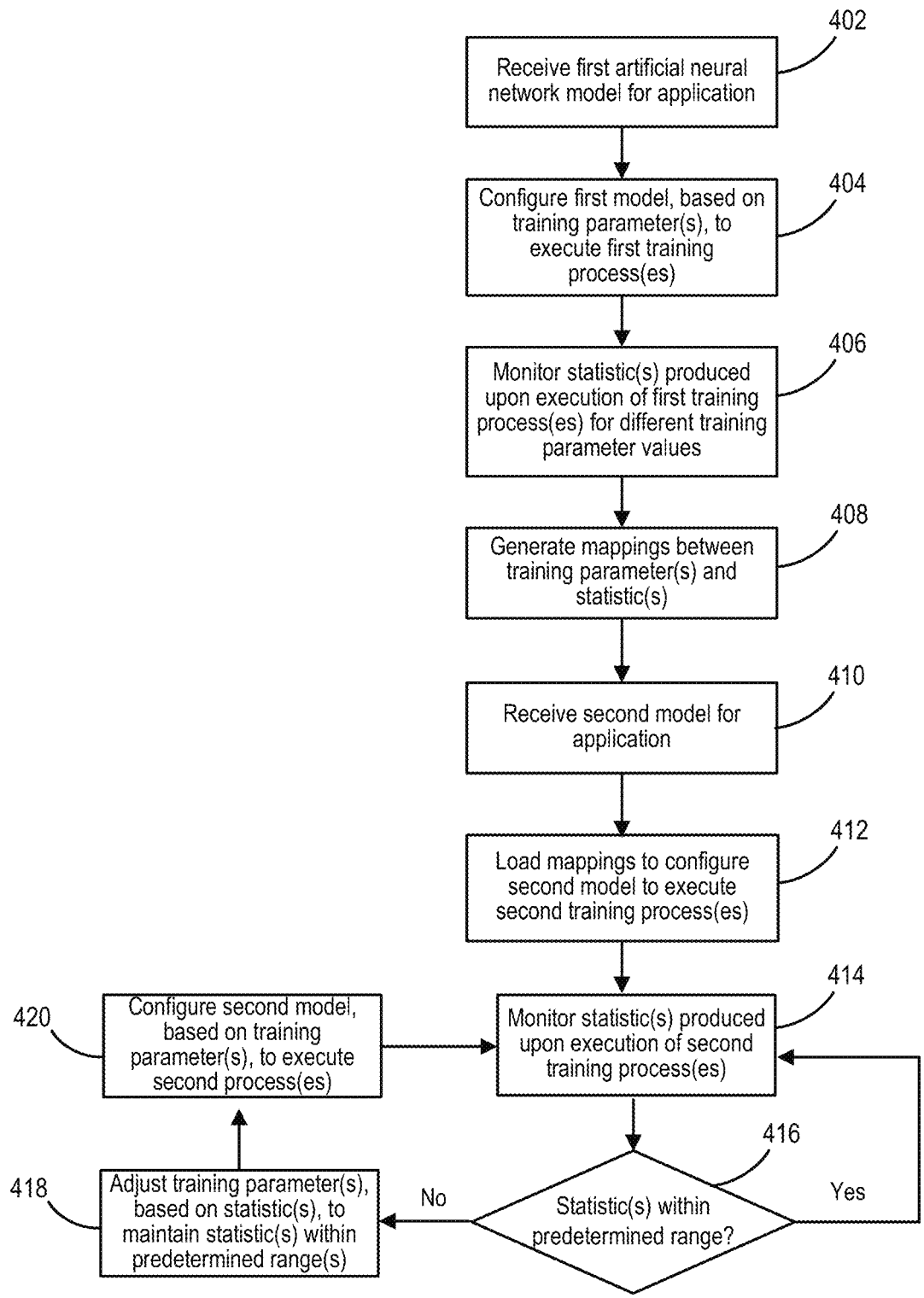
FIG. 4 illustrates a method of training an artificial neural network according to another embodiment.

FIG. 4 illustrates a method of training an artificial neural network according to an embodiment. In this example, a smaller neural network model (e.g., fewer nodes, layers, or weights) may be trained to efficiently characterize relationships between monitored statistics and training parameters for training a larger neural network model.

At 402, one or more control processor(s) may receive a first neural network model having a first model size (e.g., a smaller size) for a given application. At 404, control processor(s) may configure the first model, based on training parameter(s), to execute first training process(es) on one or more AI processor(s). At 406, control processor(s) may monitor a plurality of statistics at various locations of the first model produced upon execution of the first training process(es) by the AI processor(s). In some embodiments, control processor(s) may monitor how statistics change based on changes in training parameter values (or settings). At 408, control processor(s) may generate one or more mappings which characterize relationships between statistics and training parameters (e.g., how statistics change based on changes in training parameters).

In various embodiments, the mappings may characterize relationships between statistics and training parameters in different ways. For example, the mappings may characterize relationships between adjustments of model size, batch size, learning rate, precision, sparsity, weight decay, training steps, and the like (e.g., training parameters) and measures of backpropagation gradients, gradient noise, node activations, weights, weight updates, and the like (e.g., statistics). In certain embodiments, the mappings may characterize relationships between model size and gradient noise; batch size and gradient noise; batch size and backpropagation gradients; learning rate and backpropagation gradients; learning rate and gradient noise; precision and backpropagation gradients; precision and gradient noise; weight decay and activations; weight decay and gradient noise; learning rate and activations; sparsity and gradient noise; and the like. In some embodiments, characterizations may be empirically determined during training of the smaller model (e.g., the first model) for efficiently applying to the larger model. In some embodiments, the mappings may be based on empirical measurements of the statistics. Examples of characterizations and mappings between statistics and training parameters are provided below.

Returning to the example of FIG. 4, at 410, control processor(s) may receive the second neural network model having a second model size (e.g., a larger size). At 412, control processor(s) may load the mappings generated at 408 to configure the second model to execute second training process(es) on AI processor(s) using training parameters adjusted according to the mappings. Advantageously, AI processor(s) may be configured to execute second training process(es) for the second model based on characterizations from the first training process(es) for the first model.

The second model may be ready for training by the AI processor(s). Accordingly, at 414, control processor(s) may monitor a plurality of statistics at certain locations in the second model produced upon execution of the second training process(es) by the AI processor(s). At 416, control processor(s) may determine if one or more statistic(s) are within predetermined range(s). If the one or more statistic(s) are within the predetermined range(s) (Yes), control processor(s) may continue monitoring the plurality of statistics at 414 during the training process. However, if the one or more statistic(s) are not within predetermined range(s) (No), control processor(s) may adjust training parameter(s), based on statistic(s), to maintain the one or more statistic(s) within the predetermined range(s) at 418. Then, at 420, control processor(s) may configure the model, based on the adjusted training parameter(s), to execute the second training process(es) and return to 414. In various embodiments, the first model may be significantly smaller than the second model (e.g., by orders of magnitude), such that characterization is computationally faster and more feasible on the smaller model and computationally impractical on the larger model. Advantageously, by characterizing relationships between monitored statistics and training parameters for a first model for subsequent application to a second model, a reduction of computational resources and/or time to process (e.g., reduction of compute cycles) may be achieved for training the second model.

In one example, FIG. 5A illustrates a system configured to generate mappings by training a first model 510a, and FIG. 5B illustrates a system configured to load mappings for training a second model 510b, according to an embodiment. In this example, as shown in FIG. 5A, control processor(s) 502 may receive a first model 510a having a first model size (e.g., a smaller size) for a given application. Control processor(s) 502 may configure the first model 510a, based on training parameter(s) 512, to execute first training data 516a on one or more AI processor(s) 504. Control processor(s) 502 may monitor statistics at each layer of the first model 510a produced upon execution of a training process using first training data 516a. In this example, control processor(s) 502 may implement a mapping generator 532a to generate one or more mappings characterizing relationships between the statistics and the training parameters.

In some embodiments, mapping systems may maximize model performance for a given budget. For example, mapping generator 532a may be used to create a mapping system 532b through fitting a custom model that observes how the behaviors of different network hyperparameters, such as model precision, size, gradient noise, etc,, effect the training statistics during the training of a single or series of smaller networks. The mappings generated from previous smaller runs may be combined with the training statistics and model performance data. This information is used to train a model (e.g., a neural network model) that predicts model performance given a set of input hyperparameters, including the model size, model precision, etc. Using this mapping system, optimal hyperparameters can be generated for larger models. The mapping system predicts the performance of the model based on the size and compute budget and may indicate to a user a degree of confidence in that prediction, for example. As the mapping system is trained automatically from earlier runs, further user input may not be required, removing the need to manually tune the various hyperparameters of a deep learning model. Accordingly, in certain example embodiments, power-laws and typical model statistics can be used as an automated probabilistic tool, for example, that can predict model behavior (e.g., in terms of accuracy) in a zero-shot setting for each configuration (e.g., different precision or sparsity).

As shown in FIG. 5B, control processor(s) 502 may receive a second model 510b having a second model size (e.g., a larger model size). Control processor(s) 502 may implement a mapping system 532b to load the mappings generated by the mapping generator 532a. The mapping system 532b may then configure the second model 510b to execute second training process on AI processor(s) 504 using training parameters 512 and training data 516b. Advantageously, the same parameters used to determine the mappings using the smaller model may now be adjusted based on the monitored statistics in the larger model to improve the performance of training. Specifically, control processor(s) 502 may monitor statistics at various locations (e.g., the same statistics at the same layers as in the smaller model) in the second model 510b produced upon execution of the second training process. If the one or more statistics are not within predetermined range(s), control processor(s) 502 may adjust one or more of the second training parameters 512, based on monitored statistic(s) measures, to maintain the one or more statistics within predetermined range(s). By characterizing relationships between monitored statistics and training parameters for the first (smaller) model 510a for subsequent application to the second (larger) model 510b, a reduction of computational resources and/or time to process (e.g., reduction of compute cycles) may be achieved in training the second model 510b.

It is to be understood that the mapping generator steps of FIG. 5A and statistic monitoring and training parameter adjustment steps of FIG. 5B may be performed on the same or different control processor(s) 502 in various embodiments.

Figure 6:
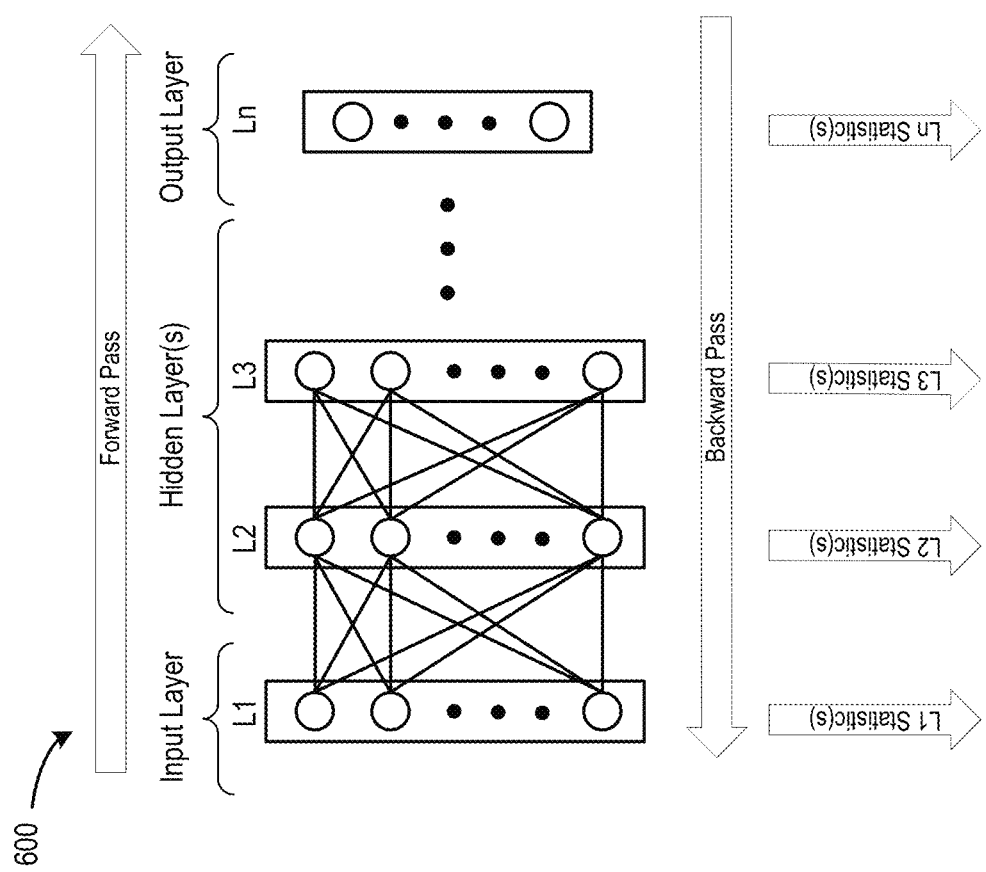
FIG. 6 illustrates an example neural network which may produce statistics according to an embodiment.

FIG. 6 illustrates an example neural network 600 which may produce statistics according to an embodiment. In this example, neural network 600 may represent a neural network model, like the model 110, which may be configured with training parameters to execute a training process on one or more AI processors. The neural network 600 may comprise, for example, a graph defining "n" layers (labeled L1—Ln; where n is an integer) of a neural network with nodes in layers connected to nodes in other layers and with connections between nodes being associated with trainable weights (e.g., parameters). The first layer (L1) may be an input layer to which training data may be applied. The last layer (Ln) may be an output layer at which outputs may be generated. Layers between L1 and Ln (e.g., L2, L3, and so forth) may be hidden layers between the first layer (L1) and the last layer (Ln). Layers closer to the first layer (L1) (e.g., layers closer to the input or toward the input relative to a midpoint of the neural network), such as the second layer (L2), may be referred to as lower layers or earlier layers. Layers closer to the output layer (Ln) (e.g., layers closer to the output or toward the output relative to a midpoint of the neural network), such as a layer n-1 before the last layer (not shown), may be referred to as higher layers or later layers.

In one example of operation, for each node of the model, AI processor(s) may execute a forward pass calculation (labeled forward pass) represented by $y=f(x_0w_0+x_1w_1+\ldots+x_nw_n)$, where y represents an output value of the node, x represents input values from connected nodes 0 to n, and w represents trainable weights (e.g., parameters) associated with connections from nodes. During training, outputs of the model (e.g., at the output layer) may be compared against known outputs for a corresponding input data set. AI processor(s) may then execute a backward pass calculation (e.g., backpropagation) (labeled backward pass) to determine gradients and weight updates. The foregoing calculations may be performed using matrix multiplication (aka, Mat-Mul) operations, for example. Activations and weights may be processed using multipliers and adders (e.g., multiply-accumulators), which may be configured to have a particular precision (e.g., a particular number of bits and a particular binary representation).

During execution of the model, AI processor(s) may produce values at each iteration, which may be measured at particular points in the neural network, and statistics may be generated from the values. As mentioned above, the measured values may include activation values, weight values, gradient values, gradient noise values, and weight update values. In this example, statistics of the measured values (described above) may be determined for particular layers of the model (e.g., on a layer-by-layer basis), including values at hidden layers, resulting from either or both of the forward and backward passes. For example, during the forward and backward passes, the last layer (e.g., output layer or Ln), may produce Ln statistics, and so forth, to the first layer (e.g., input layer or L1), which may produce L1 statistics. As mentioned above, in one example embodiment a control processor may receive the measured values for each layer of the model and generate the statistics. Advantageously, monitoring the statistics at individual layers may provide an ability to control statistics at particular target layers by adjusting one or more training parameters.

While a feedforward neural network is shown in this example, it is to be understood that the techniques described herein may be applicable to improve training of other neural network topologies.

Figure 7:
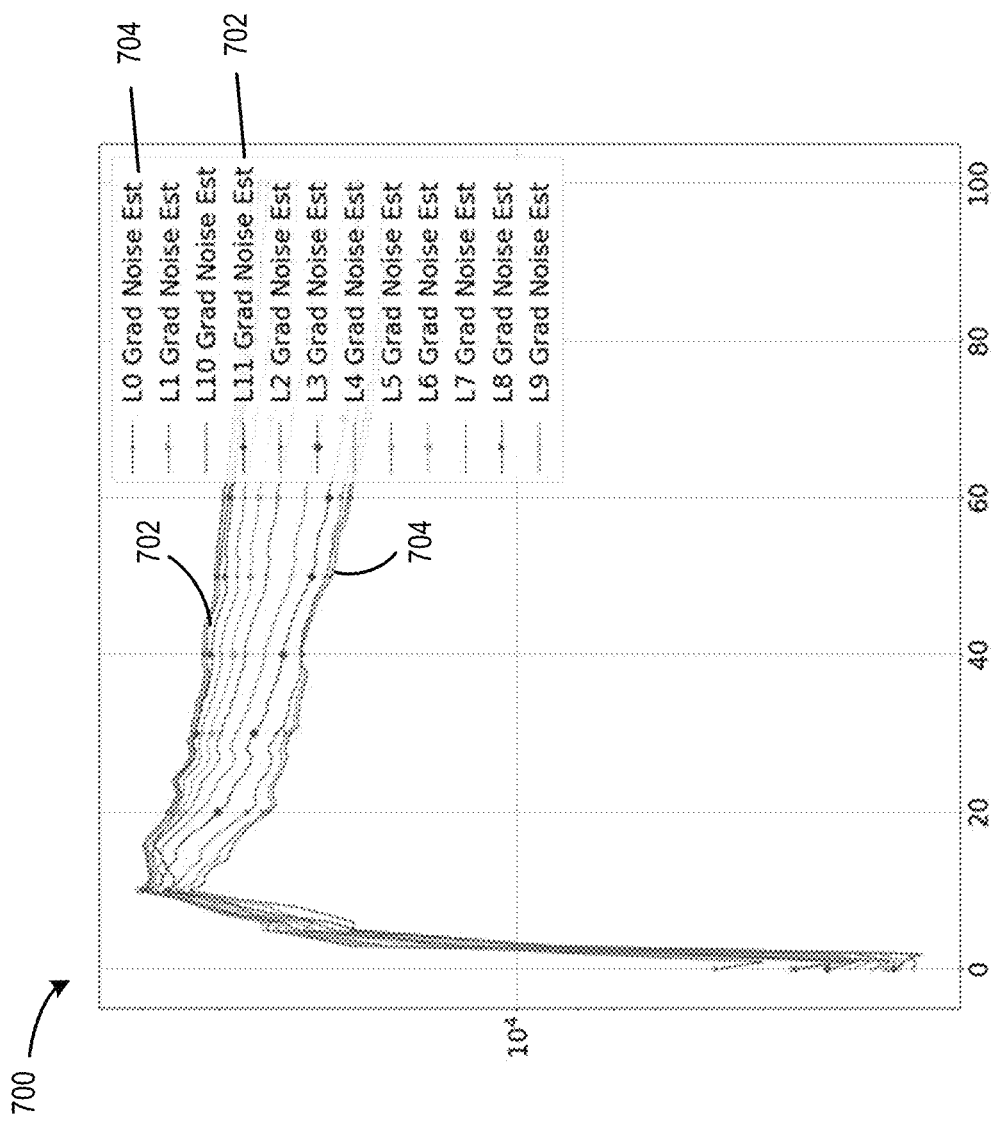
FIG. 7 illustrates a graph showing example monitored statistics according to an embodiment.

FIG. 7 illustrates a graph 700 showing example monitored statistics for a model according to an embodiment. The present example illustrates how controlling the ranges of particular statistics in particular portions of a neural network model may improve training performance. In this example, the mean gradient noise is monitored at each layer of an example 12-layer transformer model (L0-L11) in a natural language processing application ("NLP"). Here, training is improved by adjusting the training parameters such that later layers (e.g., layers closer to the output) advantageously have higher gradient noise than earlier layers (e.g., layers closer to the input). As shown in FIG. 7, at 702 a last layer (L11) of the model may have the highest gradient noise, at 704 a first layer (L0) of the model may have the lowest gradient noise, and layers in between (L1-L10) may have decreasing levels of gradient noise according to their decreasing layer positions in the model. Controlling later layers to have higher gradient noise than earlier layers may advantageously improve performance and convergence with corresponding a reduction of compute cycles in NLP, for example. However, in other models for applications in other domains (e.g., non-NLP), optimal gradient noise and other statistical distributions across the model may be different, which may be obtain through characterization techniques described above, for example.

Figure 8:
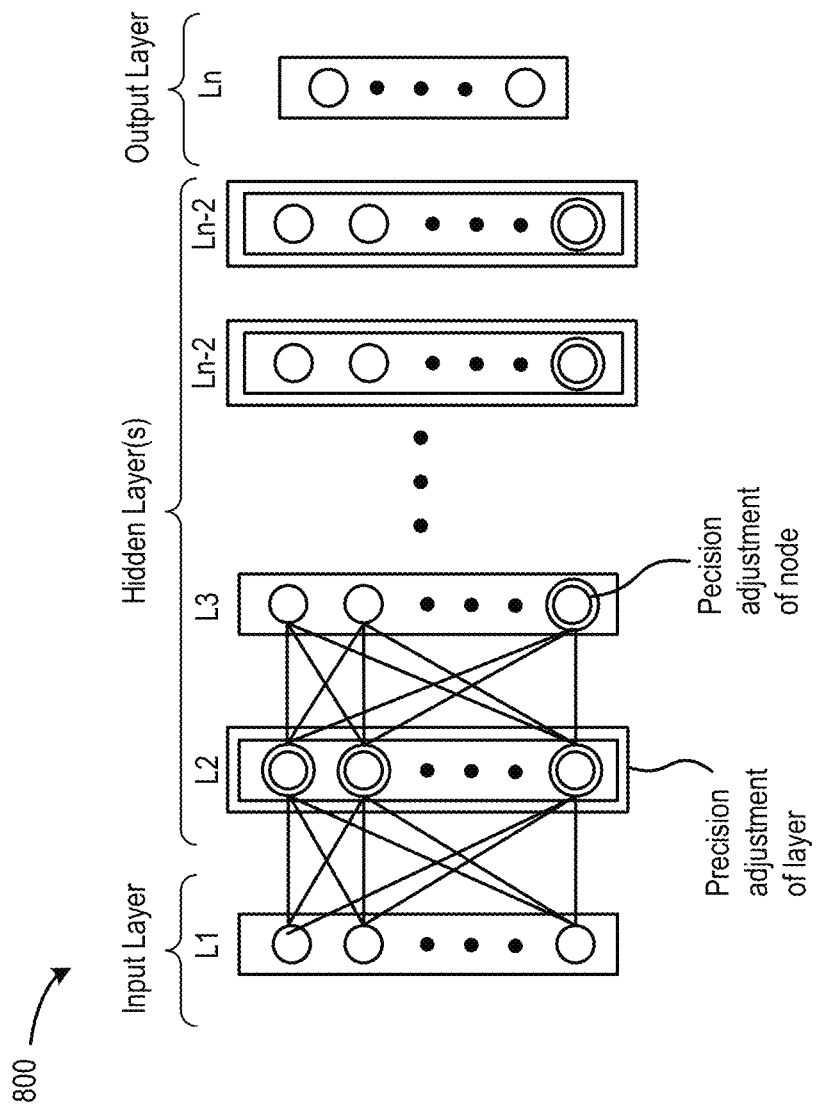
FIG. 8 illustrates an example of adjusting precisions associated with various portions of a neural network according to an embodiment.

FIG. 8 illustrates an example of adjusting precisions associated with various portions of a neural network 800 according to an embodiment. Generally, higher precision (e.g., floating point 16 or 32) increases accuracy of a model but also increase compute resources. Features and advantages of the present disclosure include adjusting precision (e.g., number of bits representing values) in different portions or locations of a model to improve training. Accordingly, a model executing a training process may be configured with high precision in some locations (e.g., particular layers or nodes) and with lower precision (e.g., 8 bit integer) in other locations where precision may not be necessary. For example, as indicated previously, precision may impact gradient noise. More specifically, precision impacts quantization noise (e.g., smaller numbers of bits representing values increases quantization noise which increases gradient noise). It may be desirable to maintain gradient noise within a range across a model being trained or at particular portions of the model (e.g., at particular layers or particular nodes). As illustrated in the example of FIG. 7, it may be desirable to tailor gradient noise across different layers. Accordingly, gradient noise may be monitored, and the precision used at each layer may be controlled to maintain the gradient noise within a predetermined range to improve training. In FIG. 8, for example, layers toward the input (e.g., L2 and L3) may be configured with a higher precision than layers toward the output (e.g., Ln-1 and Ln-2), for example. More specifically, features and advantages of the present disclosure may model gradient noise as a function of quantization noise to signal ratio (QNSR) and other hyper-parameters for robust narrow precision training, which reduces compute resources required for training.

Figure 9:
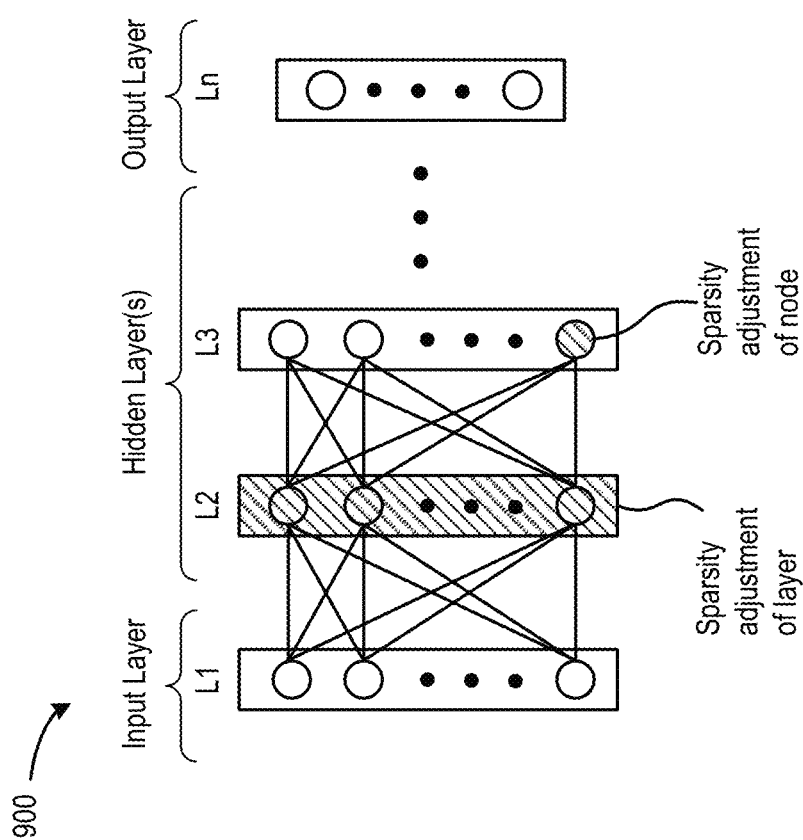
FIG. 9 illustrates an example of adjusting sparsity associated with various portions of a neural network according to an embodiment.

FIG. 9 illustrates an example of adjusting sparsity associated with various portions of a neural network 900 according to an embodiment. In this example, control processor(s), like control processor(s) 102, may adjust sparsity associated with one or more target layers and/or nodes of target layers of a model. Control processor(s) may adjust sparsity to maintain one or more statistics, associated with the target layers and/or nodes, within predetermined range(s). For example, the model may initially be configured with lower sparsity resulting in fewer calculations skipped and values forced to zero. Based on one or more statistics, such as a low gradient noise in the second layer (L2), control processor(s) may adjust sparsity associated with the second layer (L2) to provide higher sparsity resulting in more calculations skipped and values forced to zero while other layers remain with the initially configured lower sparsity. This adjustment of the second layer (L2) may allow maintaining one or more statistics in the second layer (L2) within predetermined range(s). Continuing with this example, additionally, or alternatively, control processor(s) may adjust sparsity associated with a given node of a target layer, such as the last node of the third layer (L3). This adjustment in the third layer (L3) may allow maintaining one or more other statistics associated with the third layer (L3) within predetermined range(s). It should be appreciated that many different configurations are possible for adjusting sparsity differently in various portions of a model.

Figure 10:
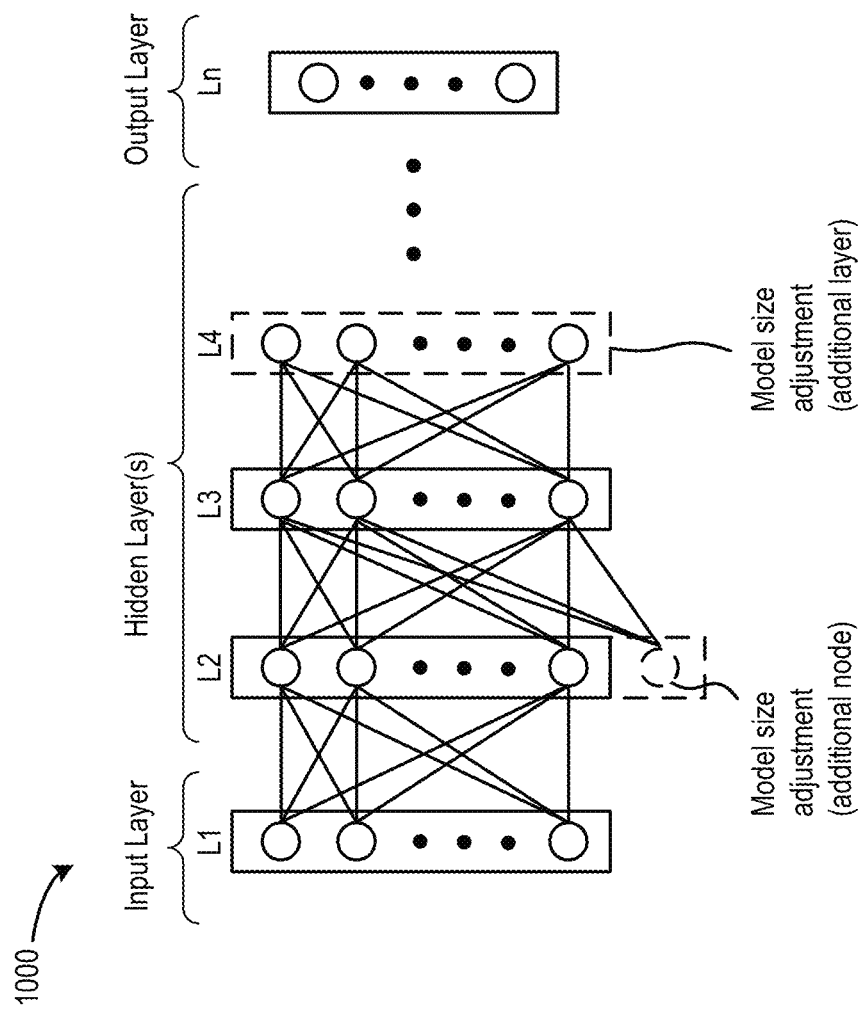
FIG. 10 illustrates an example of adjusting model size associated with various portions of a neural network according to an embodiment.

FIG. 10 illustrates an example of adjusting model size associated with various portions of a neural network 1000 according to an embodiment. In this example, control processor(s) may adjust a number of nodes associated with a target layer and/or a number of layers associated with the model. Control processor(s) may adjust the model size to maintain one or more statistic(s), which may be associated with the target layers and/or nodes of target layers, within predetermined range(s). For example, the model may initially be configured with n layers (L1 to Ln). Based on one or more statistics, control processor(s) may adjust the number of layers by adding a new layer adjacent to the third layer (L3) (e.g., additional fourth layer (L4) before or after the layer of the measured statistic), so that the model is adjusted to n+1 layers (L1 to Ln+1). This adjustment of model size (e.g., additional fourth layer (L4)) may allow maintaining one or more statistics within predetermined range(s). Continuing with this example, additionally, or alternatively, control processor(s) may adjust a number of nodes associated with a target layer, such as adding to the number of nodes in the second layer (L2). This adjustment in the second layer (L2) may allow maintaining one or more other statistics associated with the second layer (L2) within predetermined range(s). It should be appreciated that many different configurations are possible for adjusting model size differently in various portions of a model.

Figure 11:
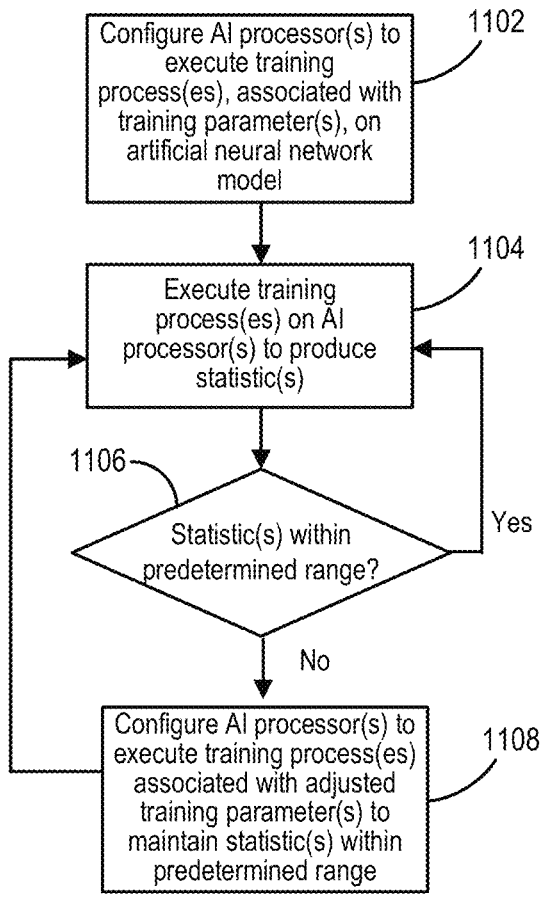
FIG. 11 illustrates a method of using AI processor(s) to scale an artificial neural network according to an embodiment.

FIG. 11 illustrates a method of using AI processor(s) to scale an artificial neural network according to an embodiment. In this example, at 1102, one or more AI processor(s) may be configured to execute training process(es), associated with a set of training parameter(s), on a neural network model. The AI processor(s) may be like the AI processor(s) 104. At 1104, AI processor(s) may execute the training process(es) to generate values having a plurality of statistics in different portions of the model. At 1106, the system may determine if one or more statistics are within one or more predetermined ranges. If the statistic(s) are within the predetermined range(s) (Yes), at 1104, AI processor(s) may continue executing the training process(es) to produce the plurality of statistics for the model until the model converges through a predetermined number of training steps. However, if the statistic(s) are not within the predetermined range(s) (No), at 1108, AI processor(s) may be configured to execute the training process(es) with adjusted training parameter(s) to maintain the statistic(s) within predetermined range(s). Then, returning to 1104, AI processor(s) may again execute the training process(es) to produce the plurality of statistics in the model.

Figure 12:
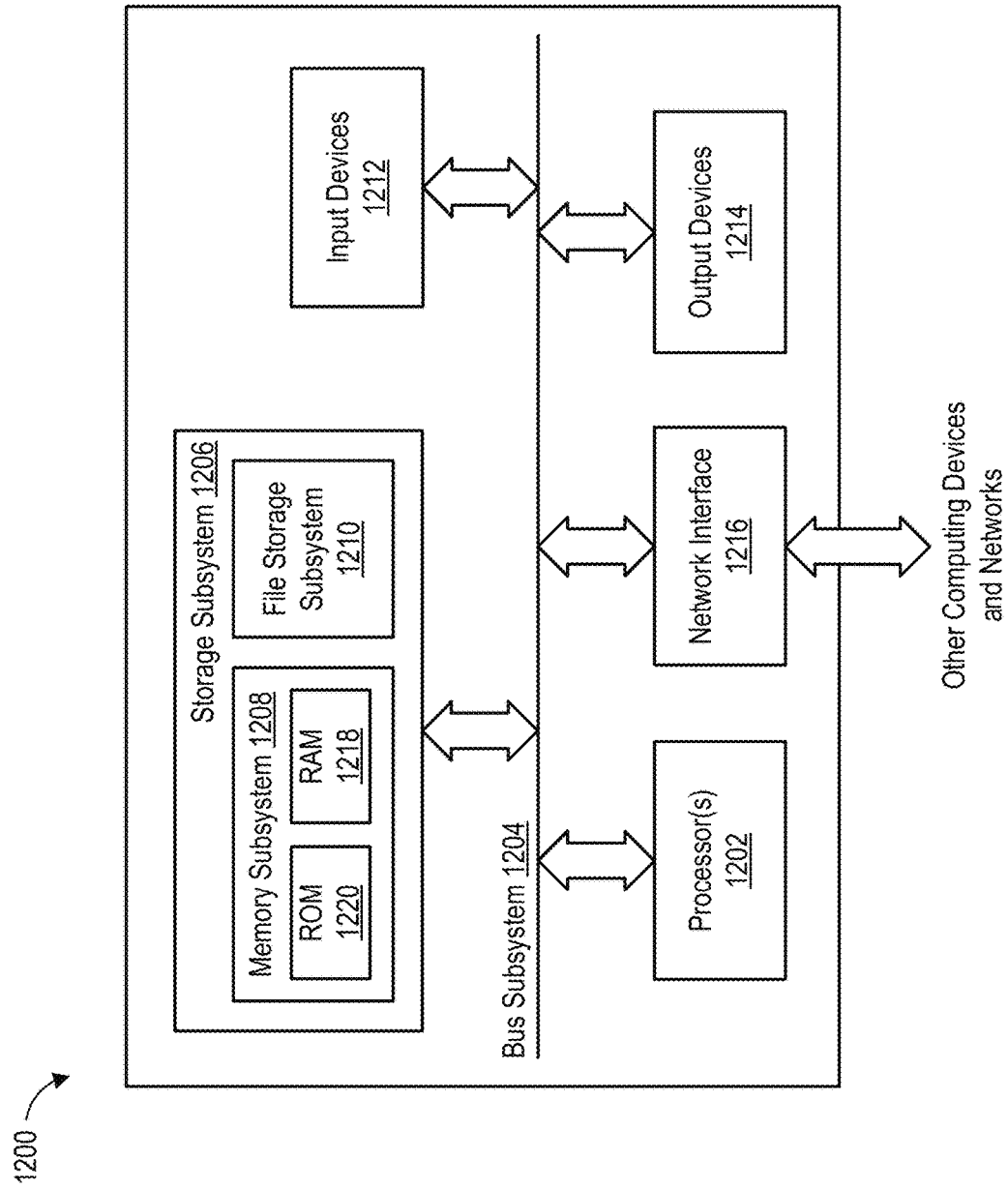
FIG. 12 illustrates a simplified block diagram of an example computer system according to an embodiment.

The techniques describe above may be implemented in a wide range of computer systems configured to process artificial neural networks. FIG. 12 illustrates a simplified block diagram of an example computer system 1200, which can be used to implement the techniques described in the foregoing disclosure. In some embodiments, computer system 1200 may be used to implement a control processor 102, for example. As shown in FIG. 12, computer system 1200 includes one or more processors 1202 that communicate with a number of peripheral devices via a bus subsystem 1204. These peripheral devices may include a storage subsystem 1206 (e.g., comprising a memory subsystem 1208 and a file storage subsystem 1210) and a network interface subsystem 1216. Some computer systems may further include user interface input devices 1212 and/or user interface output devices 1214.

Bus subsystem 1204 can provide a mechanism for letting the various components and subsystems of computer system 1200 communicate with each other as intended. Although bus subsystem 1204 is shown schematically as a single bus, alternative embodiments of the bus subsystem can utilize multiple busses.

Network interface subsystem 1216 can serve as an interface for communicating data between computer system 1200 and other computer systems or networks. Embodiments of network interface subsystem 1216 can include, e.g., Ethernet, a Wi-Fi and/or cellular adapter, a modem (telephone, satellite, cable, ISDN, etc.), digital subscriber line (DSL) units, and/or the like.

Storage subsystem 1206 includes a memory subsystem 1208 and a file/disk storage subsystem 1210. Subsystems 1208 and 1210 as well as other memories described herein are examples of non-transitory computer-readable storage media that can store executable program code and/or data that provide the functionality of embodiments of the present disclosure.

Memory subsystem 1208 includes a number of memories including a main random access memory (RAM) 1218 for storage of instructions and data during program execution and a read-only memory (ROM) 1220 in which fixed instructions are stored. File storage subsystem 1210 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1200 is illustrative and many other configurations having more or fewer components than system 1200 are possible.

Figure 13:
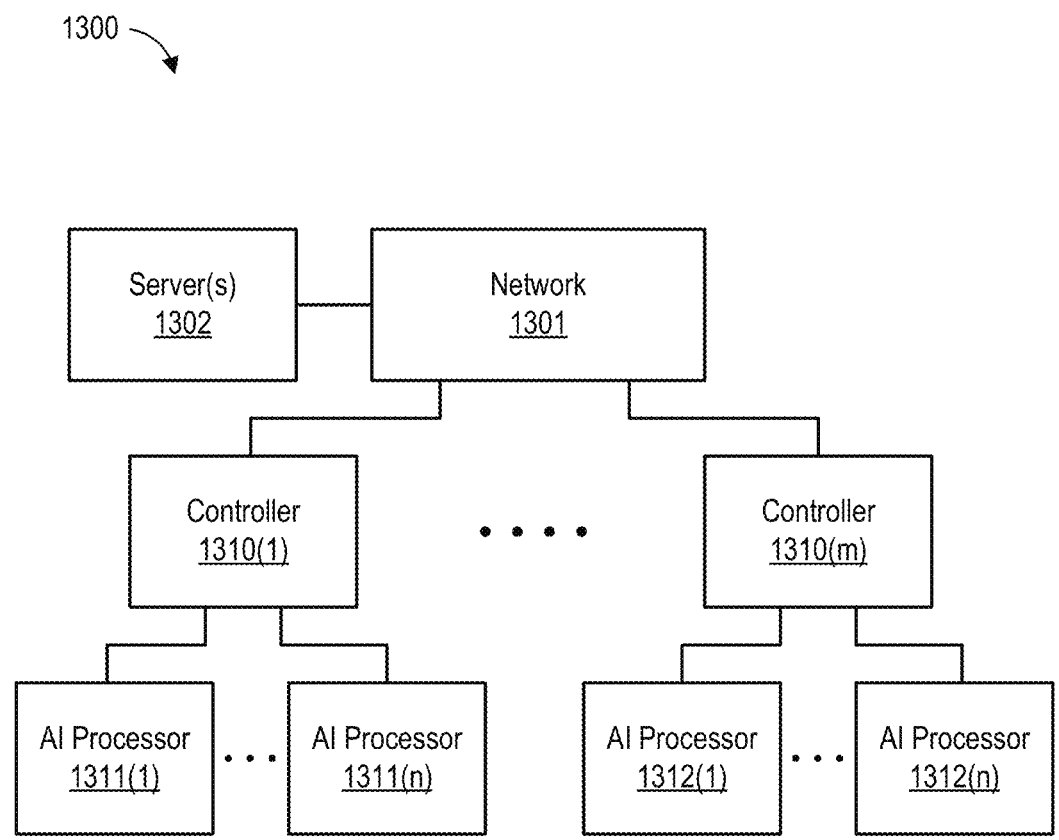
FIG. 13 illustrates an artificial neural network processing system according to an embodiment.

FIG. 13 illustrates an artificial neural network processing system according to some embodiments. In various embodiments, neural networks (e.g., neural network 600) according to the present disclosure may be implemented and trained in a hardware environment comprising one or more neural network processors (e.g., AI processor(s)). A neural network processor may refer to various graphics processing units (GPU) (e.g., a GPU for processing neural networks produced by Nvidia Corp®), field programmable gate arrays (FPGA) (e.g., FPGAs for processing neural networks produced by Xilinx®), or a variety of application specific integrated circuits (ASICs) or neural network processors comprising hardware architectures optimized for neural network computations, for example. In this example environment, one or more servers 1302, which may comprise architectures illustrated in FIG. 12 above, may be coupled to a plurality of controllers 1310(1)-1310(M) over a communication network 1301 (e.g., switches, routers, etc.). Controllers 1310(1)-1310(M) may also comprise architectures illustrated in FIG. 12 above. Each controller 1310(1)-1310(M) may be coupled to one or more neural network (NN) processors, such as processing units 1311(1)-1311(N) and 1312(1)-1312(N), for example. NN processing units 1311(1)-1311(N) and 1312(1)-1312(N) may include a variety of configurations of functional processing blocks and memory optimized for neural network processing, such as training or inference. The NN processors are optimized for neural network computations. Server 1302 may configure controllers 1310 with NN models as well as input data to the models, which may be loaded and executed by NN processing units 1311(1)-1311(N) and 1312(1)-1312(N) in parallel, for example. Models may include layers and associated weights as described above, for example. NN processing units may load the models and apply the inputs to produce output results. NN processing units may also implement training algorithms described herein, for example.

Figure 14:
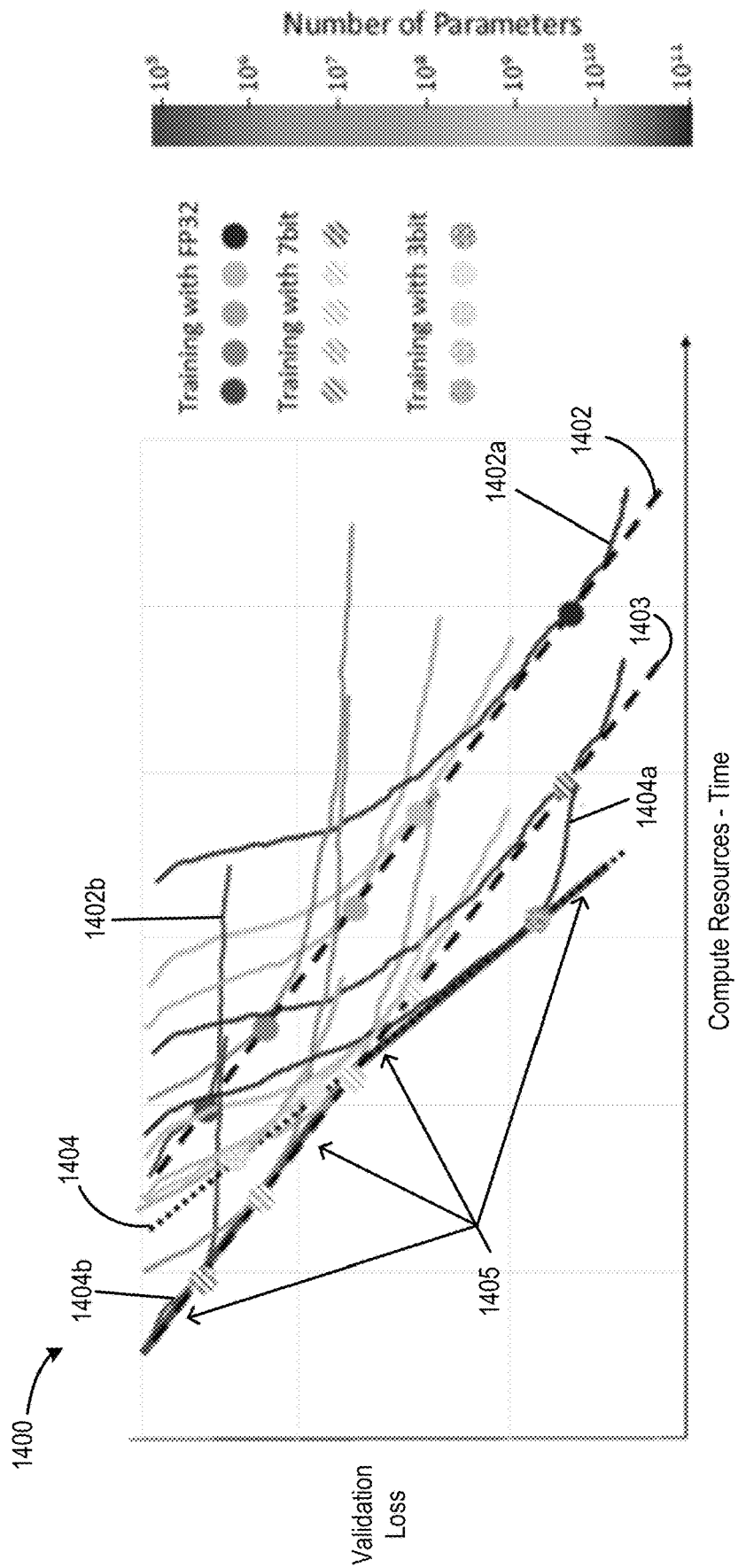
FIG. 14 illustrates an example graph showing optimizations of validation loss versus compute resources and time according to an embodiment.

FIG. 14 illustrates an example graph 1400 showing optimizations of validation loss (e.g., accuracy in predictions) versus compute resources and time to train (e.g., petaflops/s-days*cost per unit of compute) according to an embodiment. In this example, a first dashed line 1402 (shown as a right most downward dashed line) is a plot of compute optimal Pareto frontier for different size models associated with a higher precision or bit-width (e.g., FP32). The models shown intersecting line 1402 have different model sizes ranging from $10^{11}$ parameters (e.g., weights) shown by curve 1402a down to $10^5$ parameters shown by curve 1402b, for example. Models with more parameters (e.g., 1402a) achieve lower validation losses (e.g., more accuracy in predictions) than models with fewer parameters (e.g., 1402b). However, models with more parameters (e.g., 1402a) require more compute resources and time to process than models with fewer parameters (e.g., 1402b).

The compute optimal Pareto frontier may be shifted to a second dashed line 1403 (shown as the intermediate downward dashed line) by lowering precision (e.g., 7-bit). Similarly, reducing precision down to 3 bits may result in another Pareto frontier illustrated by dotted line 1404. In each case, accuracy increases as model size scales, but computer (and cost) also increases. However, this example illustrates that overlapping Pareto curves create a new, more optimal, curve illustrated at 1405. For Pareto curve 1405, reducing the precision as the model size increases may result in reduced compute resources for a given accuracy. Accordingly, some embodiments of the present disclosure may reduce precision in at least some portions of the model being trained as the model size increases to reduce the number of training steps (and compute cycles) to achieve a particular validation loss, for example.

EXAMPLE CHARACTERIZATION AND MAPPING

As discussed herein, in various embodiments, mappings implemented by a mapping system like the mapping system 132 of FIG. 1 may efficiently characterize relationships between statistics and training parameters for adjusting training parameters to optimize training of a neural network.

The following are examples of network statistics mapped to training parameters to improve training.

In a first example, when training a larger transformer model (e.g., 20 million parameters) having 6 layers, gradient noise (e.g., a statistic) may be monitored and controlled by selectively adjusting training parameters. For the model, the following trends in gradient noise may be characterized: gradient noise may stabilize to within a desired threshold after 1-10% of an overall number of training steps to convergence; lowering precision (e.g., lowering the number of bits in the quantization) may increase gradient noise; lowering the learning rate may increase gradient noise; raising the learning rate may decrease gradient noise; lowering the batch size may increase gradient noise; and raising the batch size may decrease gradient noise. Accordingly, gradient noise may be controlled by modifying one or more of the foregoing training parameters (e.g., precision, learning rate, and/or batch size). A target gradient noise for the predetermined range may be determined, for example, by using a known closed form estimate, such as Bcrit (L)=B*L1/$\alpha$B,B*~2·10$^8$ tokens,$\alpha$B~0.21, where B represents batch size, L represents cross entropy loss, and $\alpha$ represents power-law exponents for scaling. Additionally, or alternatively, a target gradient noise may be determined by monitoring training for a predetermined time with a known configuration.

Figure 15A:
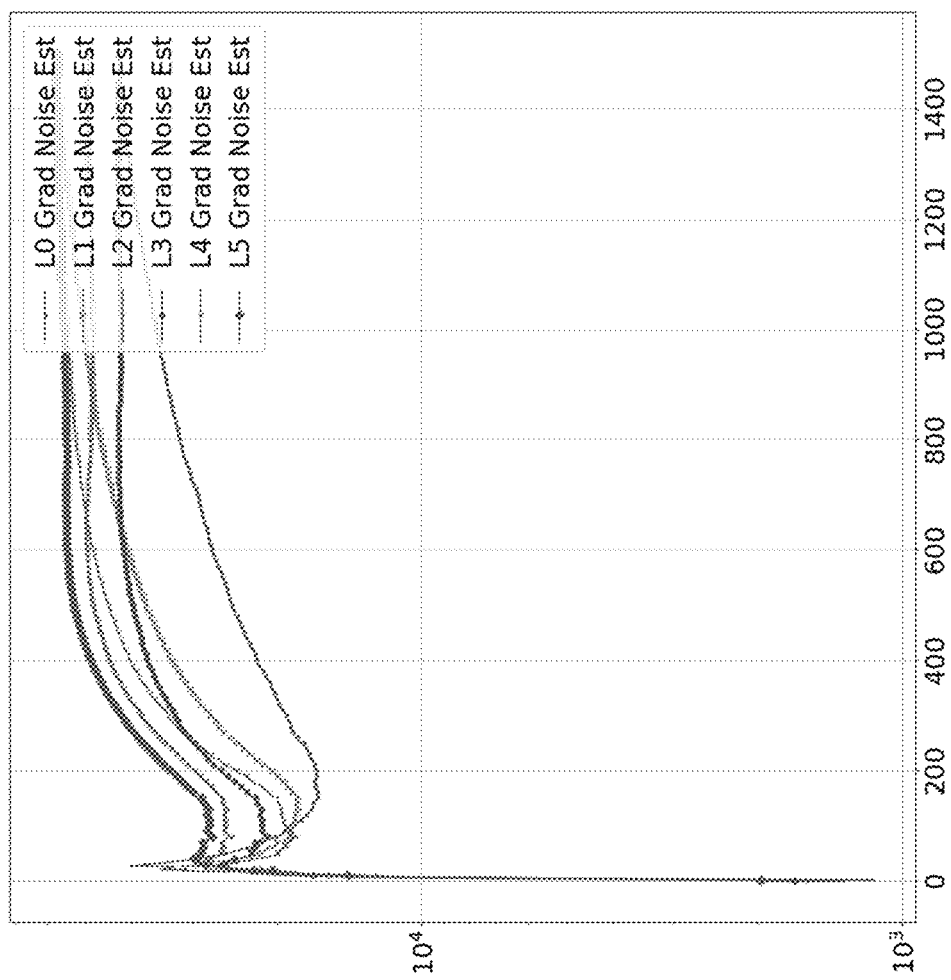
FIG. 15A illustrates a graph showing gradient noise produced by a higher precision model according to an embodiment.

With reference to FIG. 15A, when training the example transformer model with a higher precision or bit-width (e.g., 16-bits), gradient noise may be monitored to stabilize at about 10$^{4.5}$ in each of the layers as shown. With additional reference to FIG. 15D, this may result in a graph 1502 showing convergence of the higher precision model at a given validation loss (e.g., accuracy in predictions) over a number of training steps.

Figure 15B:
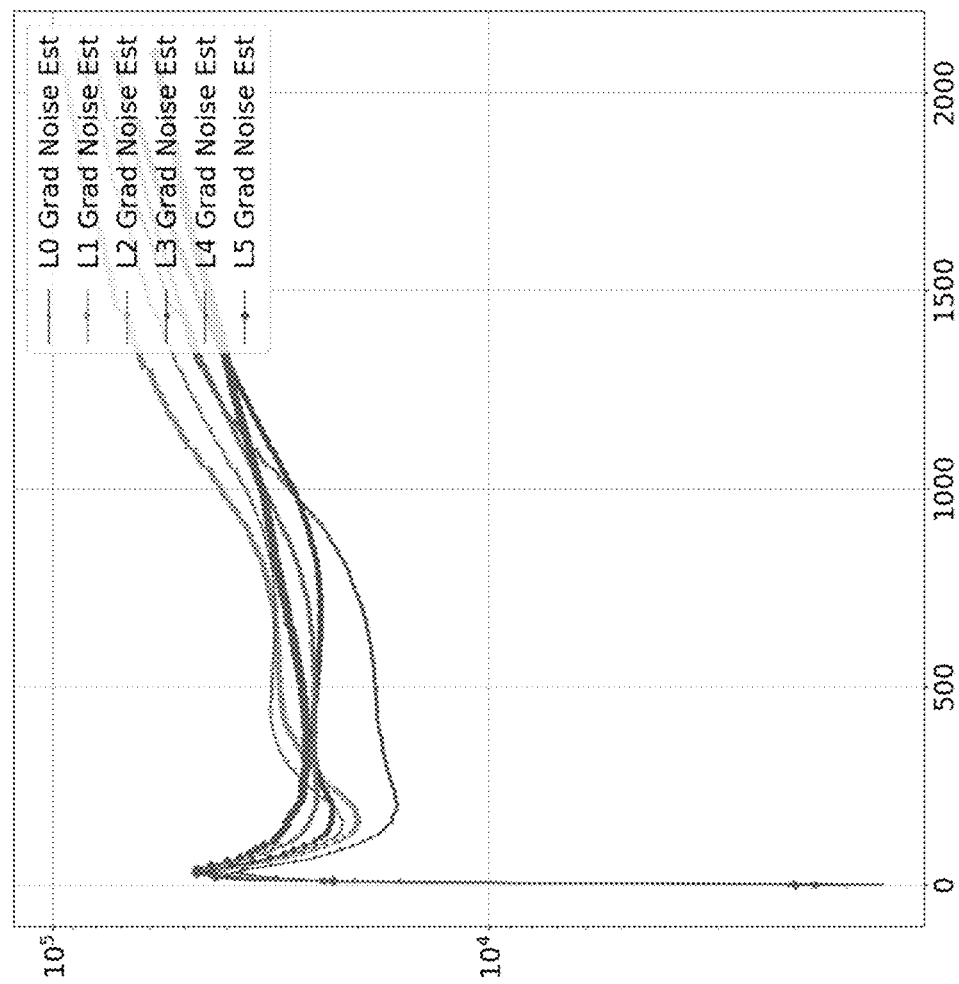
FIG. 15B illustrates a graph showing gradient noise produced by an un-optimized lower precision model according to an embodiment.
Figure 15C:
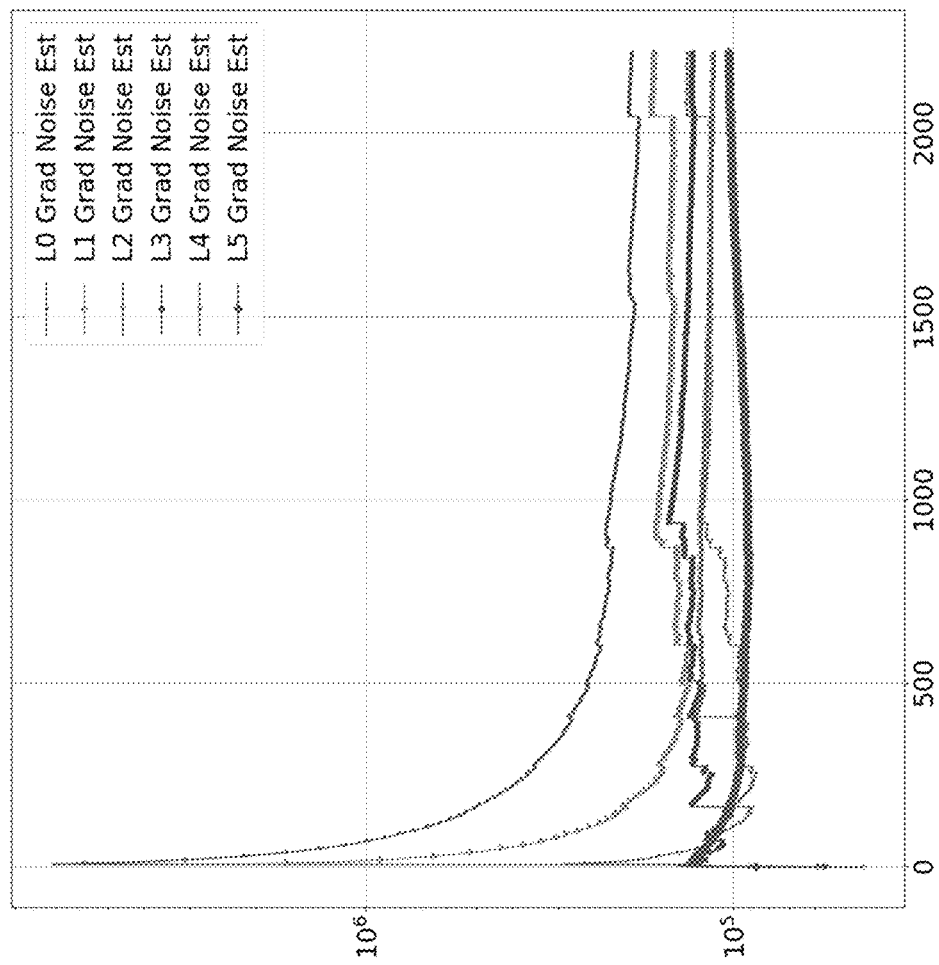
FIG. 15C illustrates a graph showing gradient noise being controlled in an optimized lower precision model according to an embodiment.
Figure 15D:
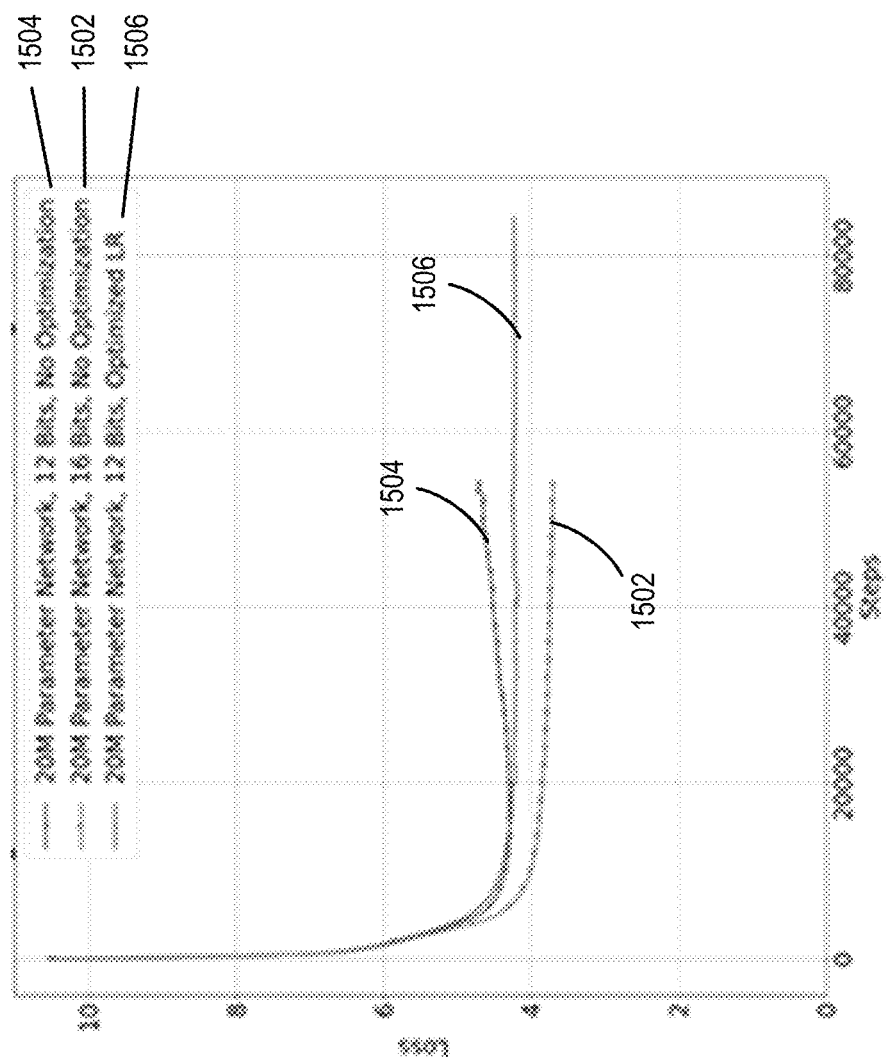
FIG. 15D illustrates a graph showing convergence of a higher precision model, divergence of an un-optimized lower precision model, and convergence of an optimized lower precision model according to an embodiment.

With reference to FIG. 15B, when training the example model with a lower precision or bit-width (e.g., 12-bits), and without adjustment to training parameter(s) (e.g., without optimization), gradient noise may increase significantly, particularly in the first two layers as shown. Referring again to FIG. 15D, this may result in a graph 1504 showing divergence (e.g., loss of accuracy in predictions) of the lower precision model, without optimization, over a number of training steps.

However, in this example, the lower precision model may be optimized by adjusting one or more training parameters to control gradient noise. For example, the learning rates may be scaled by a power series fit to a ratio between the first and last layers in the network: f(x)=ax$^k$. By fitting the equation to x=1 for the first layer and x=6 for the last layer, a per layer learning rate scale may be used. Learning rate is one training parameter that may be used to control gradient noise, and by scaling each layer relative to the first layer, gradient noise may be controlled for the lower precision model (e.g., 12-bits).

Referring again to FIG. 15D, this may result in a graph 1506 showing convergence (e.g., increase in accuracy in predictions) of the lower precision model, with optimization, over a number of training steps. Accordingly, adjusting learning rates and/or weight decays in layers of the lower precision model to control gradients in layers may result in successful convergence of the model. These relationships may be characterized for the model and mapped accordingly.

Figure 16C:
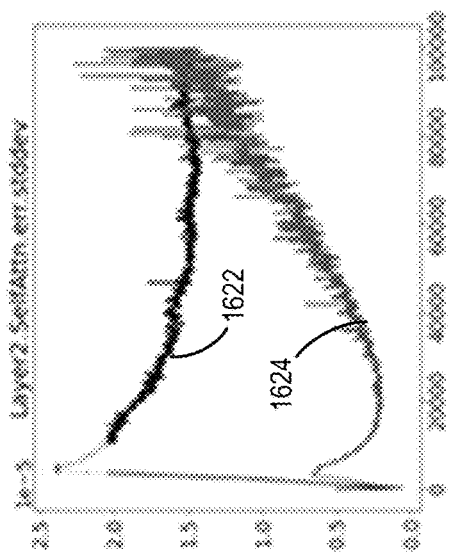
FIG. 16C illustrates a graph comparing layer gradients produced by a higher precision model and layer gradients produced by an un-optimized lower precision model according to an embodiment.

In a second example, when training a transformer model having 2 layers, standard deviations of activations and standard deviations of gradients may be monitored and controlled by adjusting learning rate and/or weight decay (e.g., training parameters). With reference to FIG. 16A, a graph 1602 shows a model associated with a higher precision or bit-width resulting in convergence (e.g., decreasing validation loss which stabilizes) over a number of training steps. However, a graph 1604 shows the model associated with a lower precision or bit-width (e.g., without optimization) resulting in divergence (e.g., increasing validation loss) over a number of training steps.

Figure 16B:
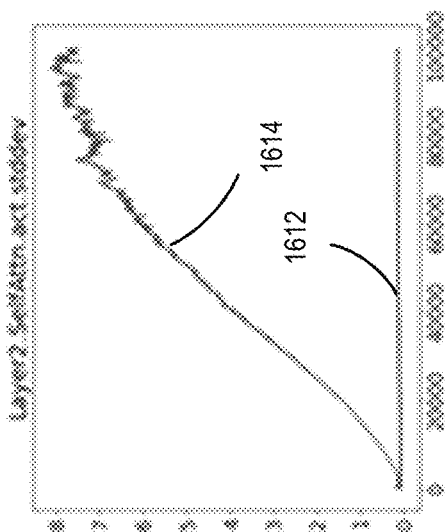
FIG. 16B illustrates a graph comparing layer activations produced by a higher precision model and layer activations produced by an un-optimized lower precision model according to an embodiment.
Figure 16A:
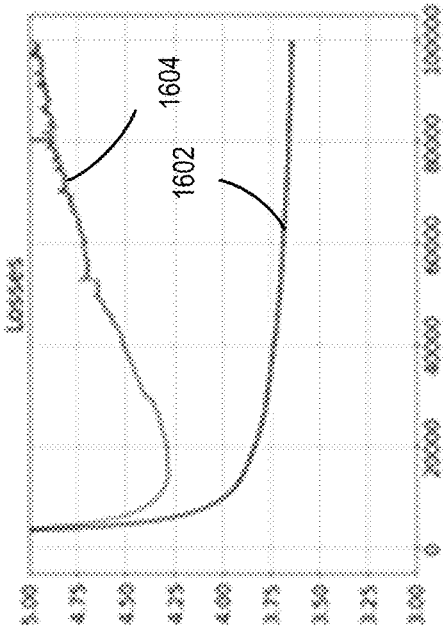
FIG. 16A illustrates a graph showing convergence of a higher precision model and divergence of an un-optimized lower precision model according to an embodiment.

With reference to FIG. 16B, standard deviations of layer activations (e.g., in an attention layer of a transformer model) may be compared between the higher precision model, graph 1612, and the lower precision model, graph 1614 (e.g., without optimization). In particular, the lower precision model leads to a significant increase in node activations when compared to the higher precision model. Accordingly, relationships between standard deviations of layer activations and training parameters, such as learning rate and/or weight decay, may be characterized to control and optimize the lower precision model.

Also, with reference to FIG. 16C, standard deviations of layer gradients may be compared between the higher precision model, graph 1622, and the lower precision model, graph 1624 (e.g., without optimization). In particular, the lower precision model leads to significantly smaller gradients in the early parts of training when compared to the higher precision model. Accordingly, relationships between standard deviations of layer gradients and training parameters, such as learning rate and/or weight decay, may be characterized to control and optimize the lower precision model.

Figure 17A:
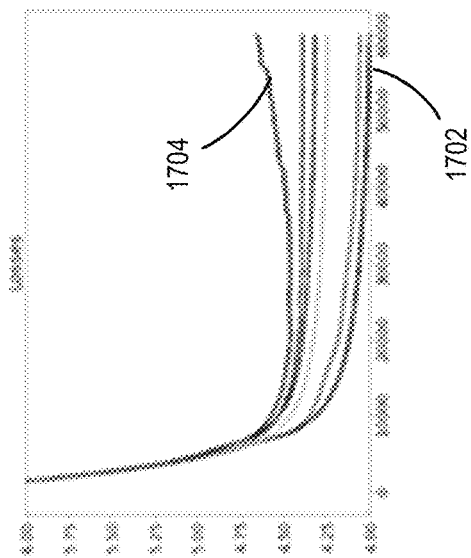
FIG. 17A illustrates a graph showing validation losses of models having differing precisions according to an embodiment.
Figure 17B:
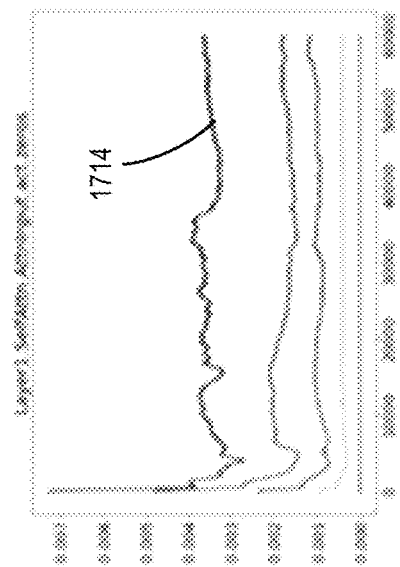
FIG. 17B illustrates a graph comparing a first example of percentage of zero values of layer activations produced by models having differing precisions according to an embodiment.

FIGS. 17A-B illustrate relationships between precision and percentage of zeros. With reference to FIG. 17A, a graph 1702 shows loss curves for different precisions (or bit-widths) over a number of training steps. Plot 1704 shows the model associated with a lower precision or bit-width (e.g., without optimization) resulting in divergence (e.g., increasing validation loss) over a number of training steps. Additional graphs for models associated with varying levels of precision are shown in between graphs 1702 and 1704.

With reference to FIG. 17B, a percentage of zero values of layer activations (e.g., a SelfAttention layer) may be compared between the lower precision model, graph 1714 (e.g., without optimization), and models with increasing levels of precision. In particular, the lower precision model contains a larger percentage of zeros as compared to the models with increasing levels of precision.

Figure 17C:
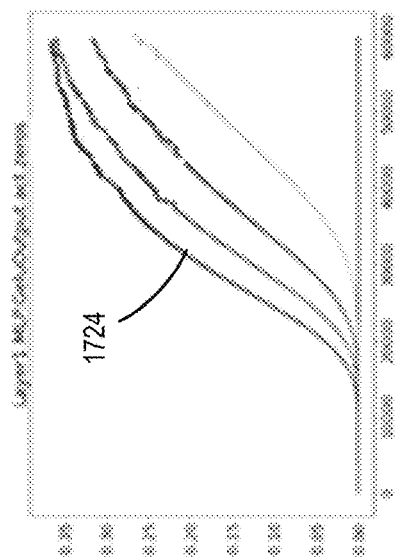
FIG. 17C illustrates a graph comparing a second example of percentage of zero values of layer activations produced by models having differing precisions according to an embodiment.

Finally, with additional reference to FIG. 17C, a percentage of zero values of layer activations (e.g., a Multi-Layer Perceptron) may be compared between the lower precision model, graph 1724 (e.g., without optimization), and models with increasing levels of precision. In particular, the lower precision model contains a larger percentage of zeros, in this case 35% of activation values being zeros in this layer at about 60,000 iterations, as compared to the models with increasing levels of precision.

Accordingly, these relationships between percentage of zero values of certain layer activations and training parameters may be characterized to control and optimize training.

FURTHER EXAMPLE EMBODIMENTS

In various embodiments, the present disclosure includes systems, methods, and apparatuses for optimizing an artificial neural network. The techniques described herein may be embodied in non-transitory machine-readable medium storing a program executable by a computer system, the program comprising sets of instructions for performing the techniques described herein. In some embodiments, a system includes one or more control processors and a non-transitory machine-readable medium storing instructions that when executed by at least one of the one or more control processors cause the at least one control processor to perform the techniques described above. In some embodiments, the non-transitory machine-readable medium may be memory, for example, which may be coupled to one or more control processors or one or more artificial intelligence processors, for example.

The following techniques may be embodied alone or in different combinations and may further be embodied with other techniques described herein.

For example, in one embodiment, the present disclosure includes one or more artificial intelligence (AI) processors; one or more control processors; and a non-transitory computer readable storage medium having stored thereon program code executable by the one or more control processors, the program code causing the one or more control processors to: receive an artificial neural network model and configure the model, based on a plurality of training parameters, to execute a training process on the one or more AI processors; monitor a plurality of statistics produced upon execution of the training process; and adjust one or more training parameters of the plurality of training parameters, based on one or more statistics of the plurality of statistics, to maintain at least one of the plurality of statistics within a predetermined range.

In one embodiment, the adjust step comprises adjusting precision associated with a target layer of the model to maintain the at least one of the plurality of statistics associated with the target layer within the predetermined range.

In one embodiment, the system further reduces the precision of at least a portion of the model as the model size increases.

In one embodiment, the monitor step comprises monitoring one or more statistics associated with a target layer of the model.

In one embodiment, the one or more statistics comprise a measure of neural network gradient noise.

In one embodiment, the adjust step comprises adjusting one or more training parameters associated with a target layer of the model.

In one embodiment, the target layer is a hidden layer. In this embodiment, the one or more training parameters comprise a parameter configuring a precision for the target layer.

In one embodiment, the target layer is a hidden layer. In this embodiment, the one or more training parameters comprises a parameter configuring a sparsity for the target layer.

In one embodiment, the target layer is a hidden layer. In this embodiment, the one or more training parameters comprises a parameter configuring a number of nodes associated with the target layer.

In one embodiment, the target layer is a hidden layer. In this embodiment, the one or more training parameters comprises a parameter configuring a number of layers associated with the model.

In one embodiment, the plurality of training parameters includes a parameter configuring a precision associated with the model. In this embodiment, the model is configured with a first precision associated with a first layer of the model and a second precision associated with a second layer of the model, the first precision being higher than the second precision, the first layer being a layer closer to an input of the model and the second layer being a layer closer to an output of the model.

In one embodiment, the plurality of training parameters includes a parameter configuring sparsity. In one embodiment, the model is configured with a first sparsity associated with a first layer of the model and a second sparsity associated with a second layer of the model, the first sparsity being different than the second sparsity, the first layer being a layer closer to an input of the model and the second layer being a layer closer to an output of the model.

In one embodiment, the model is a second model having a second size and the training process is a second training process. In this embodiment, prior to the receive step, the program code causes the one or more control processors to: receive a first model and configure the first model, based on a plurality of training parameters, to execute a first training process, wherein the first model is a smaller version of the second model, and wherein the first model has a first model size, and the first model size is substantially smaller than the second model size; monitor a plurality of statistics produced upon execution of the first training process; and generate one or more mappings between the plurality of statistics and the plurality of training parameters.

In one embodiment, the program code causes the one or more control processors to load the one or more mappings to adjust one or more training parameters, based on one or more statistics, for execution of the second training process.

In one embodiment, the program code causes the one or more control processors to load the one or more mappings comprising trained models forming relations between the statistics and the parameters.

In one embodiment, the plurality of training parameters includes one or more of: a parameter configuring a model size; a parameter configuring a batch size; a parameter configuring a learning rate; a parameter configuring a precision; and a parameter configuring a sparsity.

In one embodiment, the plurality of statistics includes one or more of: a measure of neural network gradients; a measure of neural network gradient noise; a measure of neural network node activations; a measure of neural network weights; and a measure of neural network weight updates.

In one embodiment, one or more measures include one or more of: a mean measurement; a standard deviation measurement; and a percentage of zero values measurement.

In one embodiment, the training process is partitioned to execute on a plurality of AI processors. In this embodiment, measures of the plurality of statistics are received from the plurality of AI processors.

In one embodiment, the present disclosure includes one or more AI processors configured to execute a training process on an artificial neural network model, the training process having an associated set of training parameters, wherein execution of the training process produces a plurality of statistics; and one or more control processors coupled to the one or more AI processors, the one or more control processors being configured to receive the plurality of statistics, and in accordance therewith, adjust one or more of the training parameters to maintain at least one of the plurality of statistics within a predetermined range during execution of the training process.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A system comprising:
one or more artificial intelligence (AI) processors;
one or more control processors; and
a non-transitory computer readable storage medium having stored thereon program code executable by the one or more control processors, the program code causing the one or more control processors to:
receive an artificial neural network model and configure the model, based on a plurality of training parameters, to execute a training process on the one or more AI processors;
monitor a plurality of statistics produced upon execution of the training process; and
adjust one or more training parameters of the plurality of training parameters, based on one or more statistics of the plurality of statistics, to maintain at least one of the plurality of statistics within a predetermined range, wherein the plurality of training parameters includes a parameter configuring a precision associated with the artificial neural network model, and wherein the artificial neural network model is configured with a first precision associated with a first layer of the artificial neural network model and a second precision associated with a second layer of the artificial neural network model, the first precision being higher than the second precision, and the first layer being a layer closer to an input of the artificial neural network model and the second layer being a layer closer to an output of the artificial neural network model.

2. The system of claim 1 wherein the adjust step comprises adjusting precision associated with a target layer of the model to maintain the at least one of the plurality of statistics associated with the target layer within the predetermined range.

3. The system of claim 1 further comprising reducing the precision of at least a portion of the model as the model size increases.

4. The system of claim 1 wherein the monitor step comprises monitoring one or more statistics associated with a target layer of the model.

5. The system of claim 4 wherein the one or more statistics comprise a measure of neural network gradient noise.

6. The system of claim 1 wherein the adjust step comprises adjusting one or more training parameters associated with a target layer of the model.

7. The system of claim 6 wherein the target layer is a hidden layer, and wherein the one or more training parameters comprise a parameter configuring a precision for the target layer.

8. The system of claim 6 wherein the target layer is a hidden layer, and wherein the one or more training parameters comprises a parameter configuring a sparsity for the target layer.

9. The system of claim 6 wherein the target layer is a hidden layer, and wherein the one or more training parameters comprises a parameter configuring a number of nodes associated with the target layer.

10. The system of claim 6 wherein the target layer is a hidden layer, and wherein the one or more training parameters comprises a parameter configuring a learning rate for one or more nodes in the target layer.

11. The system of claim 6 wherein the target layer is a hidden layer, and wherein the one or more training parameters comprises a parameter configuring a number of layers associated with the model.

12. The system of claim 1 wherein the plurality of training parameters includes a parameter configuring sparsity, and wherein the model is configured with a first sparsity associated with a first layer of the model and a second sparsity associated with a second layer of the model, the first sparsity being different than the second sparsity, the first layer being a layer closer to an input of the model and the second layer being a layer closer to an output of the model.

13. The system of claim 1 wherein the model is a second model having a second size and the training process is a second training process, and wherein, prior to the receive step, the program code causes the one or more control processors to:
receive a first model and configure the first model, based on a plurality of training parameters, to execute a first training process, wherein the first model is a smaller version of the second model, and wherein the first model has a first model size, and the first model size is substantially smaller than the second model size;
monitor a plurality of statistics produced upon execution of the first training process; and
generate one or more mappings between the plurality of statistics and the plurality of training parameters.

14. The system of claim 1 wherein the program code causes the one or more control processors to load the one or more mappings to adjust one or more training parameters, based on one or more statistics, for execution of the second training process.

15. The system of claim 1 wherein the program code causes the one or more control processors to load one or more mappings comprising trained models forming relations between the statistics and the parameters.

16. The system of claim 1 wherein:
the plurality of training parameters includes one or more of: a parameter configuring a model size; a parameter configuring a batch size; a parameter configuring a learning rate; a parameter configuring a precision; and a parameter configuring a sparsity, and
the plurality of statistics includes one or more of: a measure of neural network gradients; a measure of neural network gradient noise; a measure of neural network node activations; a measure of neural network weights; and a measure of neural network weight updates.

17. The system of claim 16 wherein one or more measures include one or more of: a mean measurement; a standard deviation measurement; and a percentage of zero values measurement.

18. A system comprising:
one or more artificial intelligence (AI) processors configured to execute a training process on an artificial neural network model, the training process having an associated set of training parameters,
wherein execution of the training process produces a plurality of statistics; and
one or more control processors coupled to the one or more AI processors, the one or more control processors being configured to adjust one or more of the set of training parameters, based on the one or more of the plurality of statistics, to maintain at least one of the plurality of statistics within a predetermined range during execution of the training process, wherein the set of training parameters includes a parameter configuring a precision associated with the artificial neural network model, and wherein the artificial neural network model is configured with a first precision associated with a first layer of the artificial neural network model and a second precision associated with a second layer of the artificial neural network model, the first precision being higher than the second precision, and the first layer being a layer closer to an input of the artificial neural network model and the second layer being a layer closer to an output of the artificial neural network model.

19. A method comprising:

receiving an artificial neural network model and configuring the model, based on a plurality of training parameters, to execute a training process on one or more AI processors;

monitoring a plurality of statistics produced upon execution of the training process; and adjusting one or more training parameters of the plurality of training parameters, based on one or more statistics of the plurality of statistics, to maintain at least one of the plurality of statistics within a predetermined range, wherein the plurality of training parameters includes a parameter configuring a precision associated with the artificial neural network model, and wherein the artificial neural network model is configured with a first precision associated with a first layer of the artificial neural network model and a second precision associated with a second layer of the artificial neural network model, the first precision being higher than the second precision, and the first layer being a layer closer to an input of the artificial neural network model and the second layer being a layer closer to an output of the artificial neural network model.

20. The method of claim 19, further comprising reducing the precision of at least a portion of the artificial neural network model as the model size increases.

* * * * *